US012057138B2

(12) United States Patent
Mosayyebpour Kaskari et al.

(10) Patent No.: US 12,057,138 B2
(45) Date of Patent: Aug. 6, 2024

(54) CASCADE AUDIO SPOTTING SYSTEM

(71) Applicant: Synaptics Incorporated, San Jose, CA (US)

(72) Inventors: Saeed Mosayyebpour Kaskari, Irvine, CA (US); Hong Qiu, Shanghai (CN); Atabak Pouya, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 294 days.

(21) Appl. No.: 17/571,880

(22) Filed: Jan. 10, 2022

(65) Prior Publication Data

US 2023/0223041 A1 Jul. 13, 2023

(51) Int. Cl.
*G10L 25/84* (2013.01)
*G10L 21/0208* (2013.01)
(Continued)

(52) U.S. Cl.
CPC .......... *G10L 25/84* (2013.01); *G10L 21/0208* (2013.01); *H04R 3/005* (2013.01);
(Continued)

(58) Field of Classification Search
CPC ..... G10L 25/84; G10L 25/51; G10L 21/0208; G10L 25/78; G10L 15/063; G10L 15/16;
(Continued)

(56) References Cited

U.S. PATENT DOCUMENTS 6,370,500 B1 4/2002 Huang et al.
8,392,184 B2 3/2013 Buck et al.
(Continued)

FOREIGN PATENT DOCUMENTS

CN 104715750 A 6/2015
JP 2001-100800 A 4/2001
(Continued)

OTHER PUBLICATIONS

Lena et al., "Speech Enhancement in Vehicular Environments as a Front End for Robust Speech Recogniser," 2017 International Conference on Intelligent Computing and Control Systems (ICICCS), pp. 430-435, 2017.
(Continued)

*Primary Examiner* — Yogeshkumar Patel
(74) *Attorney, Agent, or Firm* — Paradice & Li LLP

(57) ABSTRACT

Systems and methods for identifying audio events in one or more audio streams include the use of a cascade audio spotting system (such as a cascade keyword spotting system (KWS)) to reduce power consumption while maintaining a desired performance. An example cascade audio spotting system may include a first module and a high-power subsystem. The first module is to receive an audio stream from one or more audio streams, process the audio stream to detect a first target sound activity in the audio stream, and provide a first signal in response to detecting the first target sound activity in the audio stream. The high-power subsystem is to (in response to the first signal being provided by the first module) receive the one or more audio streams and process the one or more audio streams to detect a second target sound activity in the one or more audio streams.

19 Claims, 15 Drawing Sheets

(51) Int. Cl.
*G10L 21/0216* (2013.01)
*G10L 25/78* (2013.01)
*H04R 3/00* (2006.01)

(52) U.S. Cl.
CPC ............... *G10L 2021/02082* (2013.01); *G10L 2021/02166* (2013.01); *G10L 2025/786* (2013.01)

(58) Field of Classification Search
CPC ..... G10L 15/20; G10L 15/22; G10L 21/0216; G10L 25/30; G10L 2021/02082; G10L 2021/02166; G10L 2025/786; G10L 2015/223; G06N 20/00; H04R 3/005
See application file for complete search history.

(56) References Cited

U.S. PATENT DOCUMENTS

| | | | |
|---|---|---|---|
| 8,660,274 | B2 | 2/2014 | Wolff et al. |
| 8,972,252 | B2 | 3/2015 | Hung et al. |
| 9,054,764 | B2 | 6/2015 | Tashev et al. |
| 9,432,769 | B1 | 8/2016 | Sundaram et al. |
| 9,589,560 | B1 | 3/2017 | Vitaladevuni |
| 9,734,822 | B1 | 8/2017 | Sundaram et al. |
| 9,741,360 | B1 | 8/2017 | Li et al. |
| 9,881,634 | B1 | 1/2018 | Corey |
| 10,090,000 | B1 | 10/2018 | Tzirkel-Hancock et al. |
| 10,096,328 | B1 | 10/2018 | Markovich-Golan et al. |
| 10,224,053 | B2 | 3/2019 | Ali et al. |
| 10,504,539 | B2 | 12/2019 | Kaskari et al. |
| 10,679,617 | B2 | 6/2020 | Mustiere et al. |
| 10,777,189 | B1 | 9/2020 | Fu et al. |
| 10,957,338 | B2 | 3/2021 | Nesta et al. |
| 11,064,294 | B1 | 7/2021 | Masnadi-Shirazi et al. |
| 11,069,353 | B1 | 7/2021 | Gao et al. |
| 11,087,780 | B2 | 8/2021 | Crespi et al. |
| 11,445,294 | B2 | 9/2022 | Koschak et al. |
| 2003/0053639 | A1 | 3/2003 | Beaucoup et al. |
| 2003/0112983 | A1 | 6/2003 | Rosca et al. |
| 2003/0231775 | A1 | 12/2003 | Wark |
| 2005/0049865 | A1 | 3/2005 | Yaxin et al. |
| 2006/0075422 | A1 | 4/2006 | Choi et al. |
| 2007/0021958 | A1 | 1/2007 | Visser et al. |
| 2008/0082328 | A1 | 4/2008 | Lee |
| 2008/0147414 | A1 | 6/2008 | Son et al. |
| 2008/0240463 | A1 | 10/2008 | Florencio et al. |
| 2009/0238377 | A1 | 9/2009 | Ramakrishnan et al. |
| 2010/0017202 | A1 | 1/2010 | Sung et al. |
| 2010/0296668 | A1 | 11/2010 | Lee et al. |
| 2011/0010172 | A1 | 1/2011 | Konchitsky |
| 2012/0215519 | A1 | 8/2012 | Park et al. |
| 2013/0046536 | A1 | 2/2013 | Lu et al. |
| 2013/0301840 | A1 | 11/2013 | Yemdji et al. |
| 2014/0024323 | A1 | 1/2014 | Clevom et al. |
| 2014/0056435 | A1 | 2/2014 | Kjems et al. |
| 2014/0180674 | A1 | 6/2014 | Neuhauser et al. |
| 2014/0180675 | A1 | 6/2014 | Neuhauser et al. |
| 2014/0330556 | A1 | 11/2014 | Resch et al. |
| 2014/0337036 | A1* | 11/2014 | Haiut ...................... G10L 25/78 704/275 |
| 2014/0358265 | A1 | 12/2014 | Wang et al. |
| 2015/0032446 | A1 | 1/2015 | Dickins et al. |
| 2015/0081296 | A1 | 3/2015 | Lee et al. |
| 2015/0094835 | A1 | 4/2015 | Eronen et al. |
| 2015/0112673 | A1* | 4/2015 | Nandy .................. G10L 19/002 704/231 |
| 2015/0117649 | A1 | 4/2015 | Nesta et al. |
| 2015/0256956 | A1 | 9/2015 | Jensen et al. |
| 2015/0286459 | A1 | 10/2015 | Habets et al. |
| 2015/0317980 | A1 | 11/2015 | Vermeulen et al. |
| 2015/0340032 | A1 | 11/2015 | Gruenstein |
| 2015/0372663 | A1 | 12/2015 | Yang |
| 2016/0057549 | A1 | 2/2016 | Marquis et al. |
| 2016/0078879 | A1 | 3/2016 | Lu et al. |
| 2016/0093290 | A1 | 3/2016 | Lainez et al. |
| 2016/0093313 | A1 | 3/2016 | Vickers |
| 2016/0275961 | A1 | 9/2016 | Yu et al. |
| 2017/0092297 | A1 | 3/2017 | Sainath et al. |
| 2017/0105080 | A1 | 4/2017 | Das et al. |
| 2017/0110142 | A1 | 4/2017 | Fan et al. |
| 2017/0133041 | A1 | 5/2017 | Mortensen et al. |
| 2017/0162194 | A1 | 6/2017 | Nesta et al. |
| 2017/0178668 | A1 | 6/2017 | Kar et al. |
| 2017/0206908 | A1 | 7/2017 | Nesta et al. |
| 2017/0263268 | A1 | 9/2017 | Rumberg et al. |
| 2017/0278513 | A1 | 9/2017 | Li et al. |
| 2017/0287489 | A1 | 10/2017 | Biswal et al. |
| 2018/0039478 | A1 | 2/2018 | Sung et al. |
| 2018/0158463 | A1 | 6/2018 | Ge et al. |
| 2018/0166067 | A1 | 6/2018 | Dimitriadis et al. |
| 2018/0182388 | A1 | 6/2018 | Bocklet et al. |
| 2018/0240471 | A1 | 8/2018 | Markovich Golan et al. |
| 2018/0350379 | A1 | 12/2018 | Wung et al. |
| 2018/0350381 | A1 | 12/2018 | Bryan et al. |
| 2019/0013039 | A1* | 1/2019 | Rumberg ................ G10L 25/78 |
| 2019/0122692 | A1* | 4/2019 | Binder .................... G10L 15/26 |
| 2019/0147856 | A1 | 5/2019 | Price et al. |
| 2019/0385635 | A1 | 12/2019 | Shahen Tov et al. |
| 2020/0035212 | A1 | 1/2020 | Yamabe et al. |
| 2020/0184966 | A1 | 6/2020 | Yavagal |
| 2020/0184985 | A1 | 6/2020 | Nesta et al. |
| 2020/0225344 | A1 | 7/2020 | Yoon et al. |
| 2021/0249005 | A1 | 8/2021 | Bromand et al. |
| 2022/0051691 | A1 | 2/2022 | Goshen et al. |

FOREIGN PATENT DOCUMENTS

| | | | |
|---|---|---|---|
| JP | 2007-047427 | A | 2/2007 |
| JP | 2010-085733 | A | 4/2010 |
| JP | 2011248025 | A | 12/2011 |
| JP | 2016-080750 | A | 5/2016 |
| JP | 2018-141922 | A | 9/2018 |
| KR | 101318328 | B1 | 10/2013 |
| WO | 2004/021333 | A1 | 3/2004 |
| WO | 2014210392 | A2 | 12/2014 |
| WO | 2015008699 | A1 | 1/2015 |

OTHER PUBLICATIONS

Xiong et al., "Speech Enhancement Based on Multi-Stream Model," 2016 6$^{th}$ International Conference on Digital Home (ICDH), pp. 243-246, 2016.

Giraldo et al., "Efficient Execution of Temporal Convolutional Networks for Embedded Keyword Spotting," IEEE Transactions on Very Large Scale Integration (VLSI) Systems, vol. 29, No. 12, Dec. 12, 2021, pp. 2220-2228.

Wang et al., "A Fast Precision Tuning Solution for Always-On DNN Accelerators," IEEE Transactions on Computer-Aided Design of Integrated Circuits and Systems, vol. 41, No. 5, May 2022, pp. 1236-1248.

Croce et al., "A 760-nW, 180-nm CMOS Fully Analog Voice Activity Detection System for Domestic Environment," IEEE Journal of Solid-State Circuits 56(3): 778-787, Mar. 3, 2021.

David et al., "Fast Sequential LS Estimation for Sinusoidal Modeling and Decomposition of Audio Signals," 2007 IEEE Workshop on Applications of Signal Processing to Audio and Acoustics, New Paltz, NY, USA, 2007, pp. 211-214. (Year: 2007).

Dov et al., "Audio-Visual Voice Activity Detection Using Diffusion Maps," IEEE/ACM Transactions on Audio, Speech, and Language Processing, Apr. 2015, pp. 732-745, vol. 23, Issue 4, IEEE, New Jersey, U.S.A.

Drugman et al., "Voice Activity Detection: Merging Source and Filter-based Information," IEEE Signal Processing Letters, Feb. 2016, pp. 252-256, vol. 23, Issue 2, IEEE.

Ghosh et al., "Robust Voice Activity Detection Using Long-Term Signal Variability," IEEE Transactions on Audio, Speech, and Language Processing, Mar. 2011, 38 Pages, vol. 19, Issue 3, IEEE, New Jersey, U.S.A.

(56) References Cited

OTHER PUBLICATIONS

Kim et al., "Deep Temporal Models using Identity Skip-Connections for Speech Emotion Recognition," Oct. 23-27, 2017, 8 pages.
Wang et al., "Phase Aware Deep Neural Network for Noise Robust Voice Activity Detection," IEEE/ACM, Jul. 10-14, 2017, pp. 1087-1092.
Graf et al., "Features for Voice Activity Detection: A Comparative Analysis," EURASIP Journal on Advances in Signal Processing, Dec. 2015, 15 Pages, vol. 2015, Issue 1, Article No. 91.
Hori et al., "Multi-microphone Speech Recognition Integrating Beamforming, Robust Feature Extraction, and Advanced DNN/RNN Backend," Computer Speech & Language 00, Nov. 2017, pp. 1-18.
Hughes et al., "Recurrent Neural Networks for Voice Activity Detection," 2013 IEEE International Conference on Acoustics, Speech and Signal Processing, May 26-31, 2013, pp. 7378-7382, IEEE.
Kang et al., "DNN-Based Voice Activity Detection with Local Feature Shift Technique," 2016 Asia-Pacific Signal and Information Processing Association Annual Summit and Conference (APSIPA), Dec. 13-16, 2016, 4 Pages IEEE, Jeiu, South Korea.
Kim et al., "Power-Normalized Cepstral Coefficients (PNCC) for Robust Speech Recognition," IEEE Transactions on Audio, Speech, and Language Processing, Jul. 2016, pp. 1315-1329, vol. 24, Issue 7, IEEE, New Jersey, U.S.A.
Kinnunen et al., "Voice Activity Detection Using MFCC Features and Support Vector Machine," Int. Cont. on Speech and Computer (SPECOM07), 2007, 4 Pages, vol. 2, Moscow, Russia.
Li et al., "Voice Activity Detection Based on Statistical Likelihood Ratio With Adaptive Thresholding," 2016 IEEE International Workshop on Acoustic Signal Enhancement (IWAENC), Sep. 13-16, 2016, pp. 1-5, IEEE, Xi'an, China.
Lorenz et al., "Robust Minimum Variance Beamforming," IEEE Transactions on Signal Processing, May 2005, pp. 1684-1696, vol. 53, Issue 5, IEEE, New Jersey, U.S.A.
Ma et al., "Efficient Voice Activity Detection Algorithm Using Long-Term Spectral Flatness Measure," EURASIP Journal on Audio, Speech, and Music Processing, Dec. 2013, 18 Pages, vol. 2013, Issue 1, Article No. 87, Hindawi Publishing Corp., New York, U.S.A.
Taseska et al. "Relative Transfer Function Estimation Exploiting Instantaneous Signals and the Signal Subspace", 23rd European Signal Processing Conference (EUSIPCO), Aug. 2015. 404-408.
Mousazadeh et al., "Voice Activity Detection in Presence ofTransient Noise Using Spectral Clustering," IEEE Transactions on Audio, Speech, and Language Processing, Jun. 2013, pp. 1261-1271, vol. 21, No. 6, IEEE, New Jersey, U.S.A.
Ryant et al., "Speech Activity Detection on YouTube Using Deep Neural Networks," Interspeech, Aug. 25-29, 2013, pp. 728-731, Lyon, France.
Scharf et al., "Eigenvalue Beamforming using a Multi-rank MVDR Beamformer," 2006, 5 Pages.
Tanaka et al., "Acoustic Beamforming with Maximum SNR Criterion and Efficient Generalized Eigenvector Tracking," Advances in Multimedia Information Processing—PCM 2014, Dec. 2014, pp. 373-374, vol. 8879, Sorinaer.
Vorobyov, "Principles of Minimum Variance Robust Adaptive Beamforming Design," Signal Processing, 2013, 3264-3277, vol. 93, Issue 12, Elsevier.
Ying et al., "Voice Activity Detection Based on an Unsupervised Learning Framework," IEEE Transactions on Audio, Speech, and Language Processing, Nov. 2011, pp. 2624-2633, vol. 19, Issue 8, IEEE, New Jersey, U.S.A.
Written Opinion and International Search Report for International App. No. PCT/US2018/063937, 11 pages.
Written Opinion and International Search Report for International App. No. PCT/US2018/064133, 11 pages.
Written Opinion and International Search Report for International App. No. PCT/US2018/066922, 13 pages.
Li et al., "Estimation of Relative Transfer Function in the Presence of Stationary Noise Based on Segmented Power Spectral Density Matrix Subtractions", 2015 IEEE International Conference on Acoustics, Speech and Signal Processing (ICASSP), Feb. 21, 2015, 8 pages.
Zhou et al., "Optimal Transmitter Eigen-Beamforming and Space-Time Block Coding Based on Channel Mean Feedback," IEEE Transactions on Signal Processing, Oct. 2002, pp. 2599-2613, vol. 50, No. 10, IEEE, New Jersey, U.S.A.

* cited by examiner

CASCADE AUDIO SPOTTING SYSTEM

TECHNICAL FIELD

The present embodiments relate generally to audio signal processing, and more particularly for example, to a cascade audio spotting system to identify a specific audio event in audio streams.

BACKGROUND

Audio controlled devices, such as smart speakers, mobile phones, voice-enabled interfaces for various electronic devices (e.g., automobiles, appliances, etc.), and various internet of things (IoT) devices have gained popularity in recent years. These devices are typically configured to sense ambient sounds through one or more microphones and then process the received audio input to detect one or more voice commands or other audio events to be used to cause one or more operations to be performed (such as a smart speaker adjusting the volume or stopping playback, a mobile phone performing an internet search, or a smart television tuning to a specific program). To save power, many audio controlled devices enter a low power mode when inactive. However, an audio processing portion of the device to detect one or more spoken keywords (such as Siri, Alexa, or Google) or other audio event remains in an active mode in an always on manner while the device is in a low power mode. If the audio processing portion detects a keyword or other audio event, the device wakes up from the low power mode into an active mode to enable further processing of one or more succeeding voice commands or other audio events in order to perform one or more operations associated with the voice commands or audio events.

Because many audio controlled devices are battery limited or are otherwise to have low power consumption (such as many IoT devices), there is a need to reduce the power consumption of the audio processing portion of the device to detect spoken keywords or other audio events while maintaining a desired level of performance.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Systems and methods disclosed herein include a cascade audio spotting system including multiple modules designed to operate sequentially in a cascade process to reduce power consumption during operation. An initial module in the cascade audio spotting system consumes less power than a later module in the cascade audio spotting system, with the later module achieving a more desired level of performance than the initial module. Cascading modules so that later modules are used only based on the performance of previous modules reduces power consumption without sacrificing overall performance.

Some aspects of the present disclosure are regarding an example method of operating a cascade audio spotting system. The method includes receiving, by a first module of the cascade audio spotting system, an audio stream from one or more audio streams. The method also includes processing, by the first module, the audio stream to detect a first target sound activity in the audio stream. The method further includes providing a first signal by the first module in response to detecting the first target sound activity in the audio stream. The method also includes, in response to the first signal being provided by the first module, receiving the one or more audio streams by a high-power subsystem and processing the one or more audio streams by the high-power subsystem to detect a second target sound activity in the one or more audio streams.

In some implementations, the method also includes switching the high-power subsystem from a low power mode to an active mode in response to the first signal being provided by the first module.

The first module may include one of an analog voice activity detector (VAD) (with the audio stream including an analog audio stream), a digital VAD (with the audio stream including a stream of digital audio frames converted from the analog audio stream), or a low-power trigger (with the audio stream including the stream of digital audio frames converted from the analog audio stream). In some implementations, the low-power trigger includes a first set of one or more detection models to identify the first target sound activity in the audio stream. The first set of one or more detection models is associated with a first set of one or more hyperparameters for the low-power trigger, and the first target sound activity includes one or more spoken keywords in the audio stream. The high-power subsystem may include a high-power trigger to detect a second target sound activity in the one or more audio streams. The high-power trigger includes a second set of one or more detection models to identify the second target sound activity, the second set of one or more detection models is associated with a second set of one or more hyperparameters for the high-power trigger, and the second target sound activity is the same as the first target sound activity. In some implementations, the second set of one or more detection models for the high-power trigger includes the first set of one or more detection models, and the set of one or more hyperparameters associated with the first set of one or more detection models for the high-power trigger differs from the first set of one or more hyperparameters. In some implementations, the first set of one or more detection models and the second set of one or more detection models are stored in a shared memory for the low-power trigger and the high-power trigger.

The method may also include receiving, by the high-power subsystem, a reference signal associated with the one or more audio streams. Processing the one or more audio streams by the high-power subsystem may include detecting whether the second target sound activity is included in the reference signal and preventing detecting the second target sound activity in the one or more audio streams in response to detecting the second target sound activity in the reference signal. In some implementations, processing the one or more audio streams by the high-power subsystem includes performing echo cancellation on the one or more audio streams based on a reference signal to generate one or more echo canceled audio streams and detecting whether the second target sound activity is included in the one or more echo canceled audio streams. In some implementations, processing the one or more audio streams by the high-power subsystem includes performing multiple channel noise reduction (MCNR) on the one or more echo canceled audio streams to generate one or more MCNR outputs and detecting whether the second target sound activity is included in the one or more MCNR outputs. Performing MCNR on the one or more echo canceled audio streams may include estimating a first direction of a first portion of sound activity with reference to the cascade audio spotting system, generating a first MCNR output for the first portion of sound activity based on the first direction, estimating a second direction of a second portion of sound activity with reference to the cascade audio spotting system, and generating a second MCNR output for the second portion of sound activity based on the second direction.

The method may also include detecting whether the second target sound activity is included in one of the first MCNR output or the second MCNR output. Detecting the second target sound activity in the one or more audio streams includes detecting the second target sound activity in at least one of the first MCNR output or the second MCNR output. The method may also include providing, in response to detecting that the second target sound activity is included in one of the first MCNR output or the second MCNR output, the MCNR output including the second target sound activity to identify one or more commands for operations to be performed.

In some implementations, processing the one or more audio streams by the high-power subsystem includes using a plurality of detection models of a high-power trigger of the high-power subsystem to detect the second target sound activity in the one or more audio streams. Using the plurality of detection models may include detecting, for each detection model of the plurality of detection models, whether the second target sound activity is included in the one or more audio streams. Using the plurality of detection models may also include counting a number of detection models that detect the second target sound activity in the one or more audio streams. Using the plurality of detection models may also include comparing the number of detection models that detect the second target sound activity in the one or more audio streams to an ensemble threshold. Using the plurality of detection models may also include detecting whether the second target sound activity is included in the one or more audio streams based on the comparison.

The method may also include: receiving, by an analog VAD of the cascade audio spotting system, an analog audio stream from the one or more audio streams; detecting, by the analog VAD, whether the analog audio stream includes a dynamic audio signal; and providing, by the analog VAD, a first indication in response to detecting that the analog audio stream includes the dynamic audio signal. The method may also include: activating a digital VAD of the cascade audio spotting system in response to the first indication being provided; receiving, by the digital VAD, a digital audio stream from the one or more audio streams (with the digital audio stream being converted by an analog to digital converter (ADC) of the cascade audio spotting system before being received by the digital VAD); detecting, by the digital VAD, whether the digital audio stream includes a speech signal; and providing, by the digital VAD, a second indication in response to detecting that the digital audio stream includes the speech signal. The method may also include: activating a low-power trigger of the cascade audio spotting system in response to the second indication being provided (with the first module including the low-power trigger, the audio stream received by the first module being the digital audio stream, and the first target sound activity including one or more spoken keywords); and activating the high-power subsystem in response to the first signal being provided. The method may also include activating the ADC in response to the first indication being provided and generating, by the ADC, the digital audio signal.

Some aspects of the present disclosure are regarding an example cascade audio spotting system. The system includes a first module to: receive an audio stream from one or more audio streams; process the audio stream to detect a first target sound activity in the audio stream; and provide a first signal in response to detecting the first target sound activity in the audio stream. The system also includes a high-power subsystem to, in response to the first signal being provided by the first module: receive the one or more audio streams; and process the one or more audio streams to detect a second target sound activity in the one or more audio streams.

In some implementations, the high-power subsystem is to switch from a low power mode to an active mode in response to the first signal being provided by the first module.

The first module may include one of an analog VAD (with the audio stream including an analog audio stream), a digital VAD (with the audio stream including a stream of digital audio frames converted from the analog audio stream), or a low-power trigger (with the audio stream including the stream of digital audio frames converted from the analog audio stream). In some implementations, the low-power trigger includes a first set of one or more detection models to identify the first target sound activity in the audio stream. The first set of one or more detection models is associated with a first set of one or more hyperparameters for the low-power trigger, and the first target sound activity includes one or more spoken keywords in the audio stream. The high-power subsystem may include a high-power trigger to detect a second target sound activity in the one or more audio streams. The high-power trigger includes a second set of one or more detection models to identify the second target sound activity, the second set of one or more detection models is associated with a second set of one or more hyperparameters for the high-power trigger, and the second target sound activity is the same as the first target sound activity. In some implementations, the second set of one or more detection models for the high-power trigger includes the first set of one or more detection models, and the set of one or more hyperparameters associated with the first set of one or more detection models for the high-power trigger differs from the first set of one or more hyperparameters. In some implementations, the first set of one or more detection models and the second set of one or more detection models are stored in a shared memory for the low-power trigger and the high-power trigger.

In some implementations, the high-power subsystem is to receive a reference signal associated with the one or more audio streams. Processing the one or more audio streams by the high-power subsystem may include detecting whether the second target sound activity is included in the reference signal and preventing detecting the second target sound activity in the one or more audio streams in response to detecting the second target sound activity in the reference signal. In some implementations, processing the one or more audio streams by the high-power subsystem includes performing echo cancellation on the one or more audio streams based on a reference signal to generate one or more echo canceled audio streams and detecting whether the second target sound activity is included in the one or more echo canceled audio streams. In some implementations, processing the one or more audio streams by the high-power subsystem includes performing MCNR on the one or more echo canceled audio streams to generate one or more MCNR outputs and detecting whether the second target sound activity is included in the one or more MCNR outputs. Performing MCNR on the one or more echo canceled audio streams may include estimating a first direction of a first portion of sound activity with reference to the cascade audio spotting system, generating a first MCNR output for the first portion of sound activity based on the first direction, estimating a second direction of a second portion of sound activity with reference to the cascade audio spotting system, and generating a second MCNR output for the second portion of sound activity based on the second direction.

In some implementations, the high-power subsystem is to detect whether the second target sound activity is included in one of the first MCNR output or the second MCNR output. Detecting the second target sound activity in the one or more audio streams includes detecting the second target sound activity in at least one of the first MCNR output or the second MCNR output. The high-power subsystem may also provide, in response to detecting that the second target sound activity is included in one of the first MCNR output or the second MCNR output, the MCNR output including the second target sound activity to identify one or more commands for operations to be performed.

In some implementations, processing the one or more audio streams by the high-power subsystem includes using a plurality of detection models of a high-power trigger of the high-power subsystem to detect the second target sound activity in the one or more audio streams. Using the plurality of detection models may include detecting, for each detection model of the plurality of detection models, whether the second target sound activity is included in the one or more audio streams. Using the plurality of detection models may also include counting a number of detection models that detect the second target sound activity in the one or more audio streams. Using the plurality of detection models may also include comparing the number of detection models that detect the second target sound activity in the one or more audio streams to an ensemble threshold. Using the plurality of detection models may also include detecting whether the second target sound activity is included in the one or more audio streams based on the comparison.

The cascade audio spotting system may also include: an analog VAD, a digital VAD, and a low-power trigger. The analog VAD is to: receive an analog audio stream from the one or more audio streams; detect whether the analog audio stream includes a dynamic audio signal; and provide a first indication in response to detecting that the analog audio stream includes the dynamic audio signal. The digital VAD is to: activate in response to the first indication being provided; receive a digital audio stream from the one or more audio streams (with the digital audio stream being converted by an ADC before being received by the digital VAD); detect whether the digital audio stream includes a speech signal; and provide a second indication in response to detecting that the digital audio stream includes the speech signal. The low-power trigger is to activate in response to the second indication being provided (with the first module including the low-power trigger, the audio stream received by the first module being the digital audio stream, and the first target sound activity including one or more spoken keywords). The high-power subsystem is to activate in response to the first signal being provided. The cascade audio spotting system may also include the ADC to activate in response to the first indication being provided and to generate the digital audio signal.

Some systems and methods disclosed herein also include a cascade audio spotting system configured to operate in a regular mode and one or more sensitivity modes to improve the performance of the cascade audio spotting system in certain scenarios. A regular mode may be associated with a lower number of false acceptances and an acceptable false rejection rate by the cascade audio spotting system, and a sensitivity mode may be associated with a lower false rejection rate and an acceptable number of false acceptances by the cascade audio spotting system. Switching between modes may include using a different set of hyperparameters for one or more detection models of a high-power trigger of a high-power subsystem of the cascade audio spotting system for the different modes.

Some aspects of the present disclosure are regarding an example method of operating a high-power subsystem of a cascade audio spotting system. The method includes using one or more detection models of a high-power trigger of the high-power subsystem to detect whether a target sound activity is included in the one or more audio streams. The one or more detection models are associated with a first set of hyperparameters when the cascade audio spotting system is in a regular mode, and the one or more detection models are associated with a second set of hyperparameters when the cascade audio spotting system is in a sensitivity mode. The method also includes providing at least one of one or more processed audio streams for further processing in response to detecting the target sound activity in the one or more audio streams.

In some implementations, the method also includes: operating the cascade audio spotting system in the regular mode (with the first set of hyperparameters for the one or more detection models being used to detect whether the target sound activity is included in the one or more audio streams); determining a first number of times over a first amount of time that the target sound activity is detected in the one or more audio streams using the first set of hyperparameters; determining a second number of times over the first amount of time that the target sound activity would be detected in the one or more audio streams if the second set of hyperparameters would be used but not if the first set of hyperparameters would be used; and switching the cascade audio spotting system from the regular mode to the sensitivity mode based on the first number of times and the second number of times (with the second set of hyperparameters for the one or more detection models being used to detect whether the target sound activity is included in the one or more audio streams). The method may also include operating the cascade audio spotting system in the sensitivity mode, determining a number of times over a second amount of time that the target sound activity is detected in the one or more audio streams, and switching the cascade audio spotting system from the sensitivity mode to the regular mode based on the number of times.

In some implementations, using the one or more detection models to detect whether the target sound activity is included in the one or more audio streams includes using a first detection model to generate a first probability that the one or more audio streams includes the target sound activity and comparing the first probability to a first detection threshold. Detecting the target sound activity in the one or more audio streams is based on the comparison. The method may also include switching between the cascade audio spotting system operating in the regular mode and the sensitivity mode. Switching between the cascade audio spotting system operating in the regular mode and the sensitivity mode includes switching between using the first detection threshold and using a second detection threshold for the comparison to the first probability. The first set of hyperparameters includes the first detection threshold, and the second set of hyperparameters includes the second detection threshold.

In some implementations, using the one or more detection models to detect whether the target sound activity is included in the one or more audio streams includes: using one or more additional detection models (with each of the one or more additional detection models being used to generate an additional probability that the one or more audio streams includes the target sound activity); for each additional probability, comparing the additional probability to a detection threshold associated with the additional detection model to detect by the associated detection model whether the target sound activity is included in the one or more audio streams; counting a number of detection models that detect that the target sound activity is included in the one or more audio streams; comparing the number of detection models to a first ensemble threshold (with detecting the target sound activity in the one or more audio streams being based on the comparison of the number of detection models to the first ensemble threshold).

The method may also include switching between the cascade audio spotting system operating in the regular mode and the sensitivity mode. Switching between the cascade audio spotting system operating in the regular mode and the sensitivity mode includes one or more of: for the first detection model, switching between using the first detection threshold and using a second detection threshold for the comparison to the first probability (with the first set of hyperparameters including the first detection threshold and the second set of hyperparameters including the second detection threshold); for one or more of the additional detection models, switching between using the associated additional detection threshold and a new detection threshold for the comparison to the additional probability (with the first set of hyperparameters including the additional detection threshold and the second set of hyperparameters including the new detection threshold); or switching between using the first ensemble threshold and a second ensemble threshold (with the first set of hyperparameters including the first ensemble threshold and the second set of hyperparameters including the second ensemble threshold).

Some aspects of the present disclosure are regarding a cascade audio spotting system. The system includes a high-power subsystem to process one or more audio streams. The high-power subsystem includes a high-power trigger including one or more detection models used to detect whether a target sound activity is included in the one or more audio streams. The one or more detection models are associated with a first set of hyperparameters when the cascade audio spotting system is in a regular mode, and the one or more detection models are associated with a second set of hyperparameters when the cascade audio spotting system is in a sensitivity mode. The high-power subsystem also includes a transfer module to provide at least one of one or more processed audio streams for further processing in response to detecting the target sound activity in the one or more audio streams.

In some implementations, when the cascade audio spotting system is operating in the regular mode, the high-power trigger is configured to: use the first set of hyperparameters for the one or more detection models to detect whether the target sound activity is included in the one or more audio streams; determine a first number of times over a first amount of time that the target sound activity is detected in the one or more audio streams using the first set of hyperparameters; and determine a second number of times over the first amount of time that the target sound activity would be detected in the one or more audio streams if the second set of hyperparameters would be used but not if the first set of hyperparameters would be used. The cascade audio spotting system may be configured to switch from the regular mode to the sensitivity mode based on the first number of times and the second number of times (with the second set of hyperparameters for the one or more detection models being used to detect whether the target sound activity is included in the one or more audio streams). When the cascade audio spotting system is operating in the sensitivity mode, the high-power trigger may be configured to determine a number of times over a second amount of time that the target sound activity is detected in the one or more audio streams, and the cascade audio spotting system is configured to switch from the sensitivity mode to the regular mode based on the number of times.

In some implementations, using the one or more detection models by the high-power trigger to detect whether the target sound activity is included in the one or more audio streams includes using a first detection model to generate a first probability that the one or more audio streams includes the target sound activity and comparing the first probability to a first detection threshold. Detecting the target sound activity in the one or more audio streams is based on the comparison. The cascade audio spotting system may be configured to switch between operating in the regular mode and the sensitivity mode. Switching between operating in the regular mode and the sensitivity mode includes switching by the high-power trigger between using the first detection threshold and using a second detection threshold for the comparison to the first probability. The first set of hyperparameters includes the first detection threshold, and the second set of hyperparameters includes the second detection threshold.

In some implementations, using the one or more detection models by the high-power trigger to detect whether the target sound activity is included in the one or more audio streams includes: using one or more additional detection models (with each of the one or more additional detection models being used to generate an additional probability that the one or more audio streams includes the target sound activity); for each additional probability, comparing the additional probability to a detection threshold associated with the additional detection model to detect by the associated detection model whether the target sound activity is included in the one or more audio streams; counting a number of detection models that detect that the target sound activity is included in the one or more audio streams; and comparing the number of detection models to a first ensemble threshold (with detecting the target sound activity in the one or more audio streams being based on the comparison of the number of detection models to the first ensemble threshold).

In some implementations, the cascade audio spotting system is configured to switch between operating in the regular mode and the sensitivity mode. Switching between operating in the regular mode and the sensitivity mode includes one or more of: for the first detection model, switching between using the first detection threshold and using a second detection threshold for the comparison to the first probability (with the first set of hyperparameters including the first detection threshold and the second set of hyperparameters including the second detection threshold); for one or more of the additional detection models, switching between using the associated additional detection threshold and a new detection threshold for the comparison to the additional probability (with the first set of hyperparameters including the additional detection threshold and the second set of hyperparameters including the new detection threshold); or switching between using the first ensemble threshold and a second ensemble threshold (with the first set of hyperparameters including the first ensemble threshold and the second set of hyperparameters including the second ensemble threshold).

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. As such, the present embodiments are illustrated by way of example and are not intended to be limited by the figures of the accompanying drawings. The components in the drawings are not necessarily to scale, emphasis instead being placed upon clearly illustrating the principles of the present disclosure.

DETAILED DESCRIPTION

Figure 1:
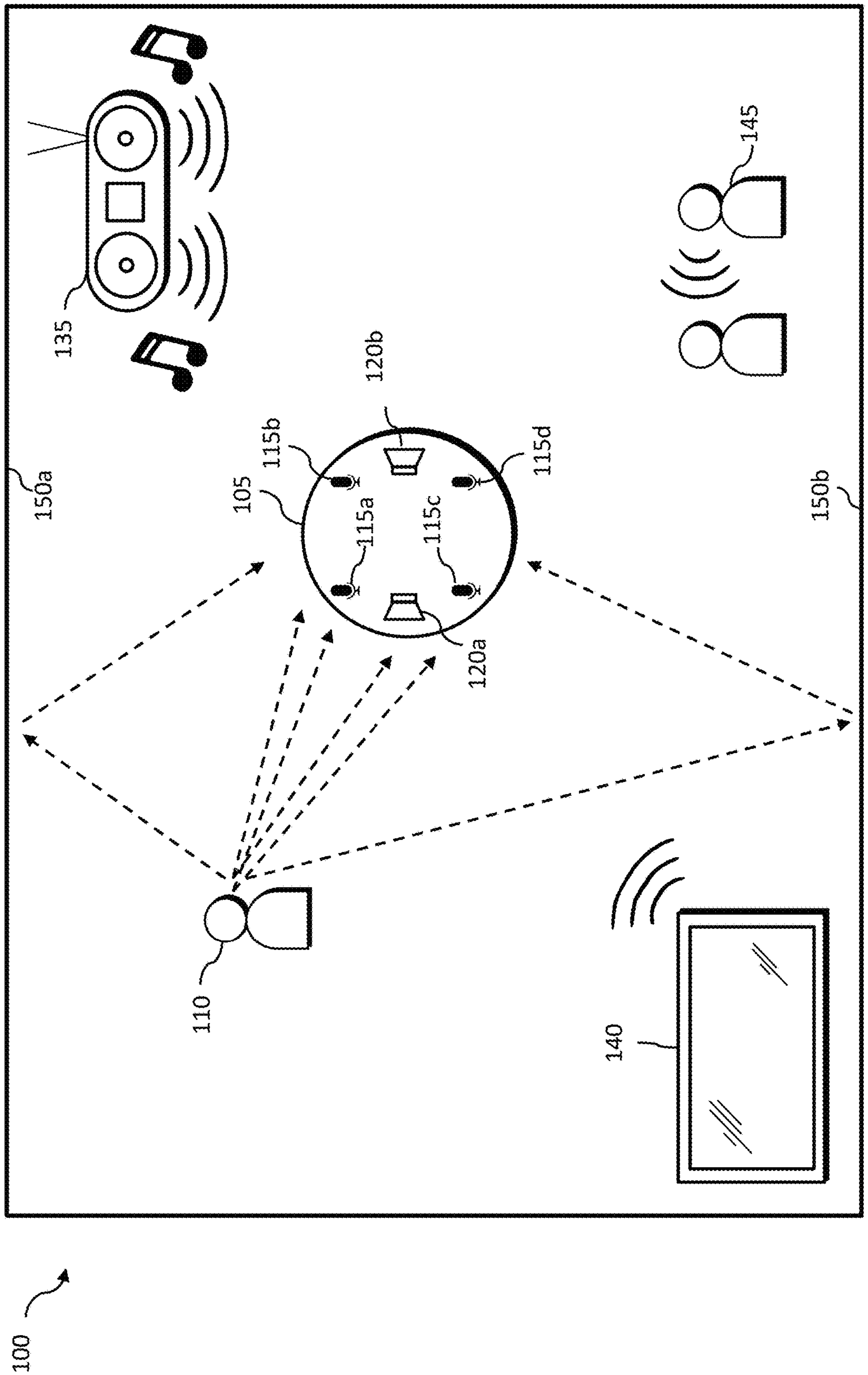
FIG. 1 illustrates an example operating environment of an audio spotting system.

Aspects of the present disclosure are regarding audio processing to identify spoken keywords or other types of audio events to be used in performing one or more operations by an audio controlled device (which may include or be referred to as an audio processing device). The audio processing may be configured to cause reduced power consumption for low power audio controlled devices while maintaining a desired level of performance in spotting an audio event.

Speech is increasingly becoming a more natural way to interact with consumer electronic devices, such as smart phones, smart speakers, automotive control systems, and other voice processing devices. For a user to be able to interact with such devices, a speech recognition portion of the device is always on. The always on nature of the speech recognition portion is not energy and resource efficient, causing power drain (which may be limited for battery powered devices) and requiring processing cycles (which may be limited for low power devices, such as many IoT devices). If processing of audio streams to identify voice commands or other audio events is removed from the device (such as being cloud based or otherwise remote to the device), an audio stream may be transmitted by the device, which may cause network congestion due to continuous transmission of audio streams from devices to the cloud and/or other network systems. Cloud-based solutions further add latency to the applications, which may negatively impact the user experience. In addition, providing audio streams including spoken language to the cloud or other remote devices implicates privacy concerns. Furthermore, transmission of the audio stream may be power intensive.

To mitigate these and other concerns, many voice-activated devices operate in a low power mode until one or more predefined spoken keywords are detected through a process commonly referred to as keyword spotting. While keyword spotting is described in many examples herein for clarity of describing aspects of the present disclosure, an audio spotting system may be configured to spot other types of audio activity. For example, an audio spotting system configured to spot other types of defined audio events may include spotting an audio signal of a specific pattern, such as an alarm or a loudspeaker output not in a human audible range from another device to command the device. Other types of audio events to be spotted other than keywords may include, e.g., a door knock, a dog barking, and so on.

Since audio spotting systems (such as keyword spotting systems (KWS)) are always on to detect a defined audio activity, it is desirable to reduce power consumption of the audio spotting system to conserve battery or other power resources. To conserve power in many voice controlled devices, KWSs are often configured to use a low power keyword detection algorithm, which is a simplified algorithm to be used to attempt to detect the presence of a spoken keyword in an audio stream while the voice controlled device is in a low power mode. When a keyword is spotted, the voice controlled device is alerted to wake up into an active mode for further processing of the audio stream (such as to identify and process one or more voice commands succeeding the spoken keyword in the audio stream). One problem with using the low-power keyword detection algorithm is that use of the simplified algorithm causes a large number of false acceptances or false rejections.

For example, audio spotting systems often operate in noisy environments, including environments with multiple human speakers, playback systems (such as loudspeakers, televisions, and so on), and other causes of ambient noise. These scenarios pose additional challenges in designing a low power system that can accurately detect a keyword in the noisy environment while keeping the number of false acceptances and false rejections low. For example, a user may turn on a voice controlled television and start interacting with the television through certain voice commands such as "change source," "open streaming application," "play movie," "volume up," and so on. For each voice command, the user will say the keyword first followed by a voice command, prompting a control system of the television to wake up multiple times to detect the new voice command and perform a desired action. Consistently detecting a keyword while a control system of the television is in a low power mode is challenging when the playback volume of the television or other environmental noise is high and interferes with the voice command.

A false acceptance (FA) refers to incorrectly identifying a target sound activity in an audio stream (such as falsely identifying a spoken keyword in the audio stream when the keyword was not spoken). For example, spoken words or other ambient noise with similar intonations may be confused as the keyword by a KWS using the simplified algorithm. Conversely, a false rejection (FR) refers to not identifying a target sound activity to be spotted by the audio spotting system (such as not identifying a spoken keyword that exists in the audio stream). For example, interference caused by other noise in the environment may prevent a KWS from identifying a keyword spoken by a user attempting to control the device. FAs trigger the audio controlled device (or at least portions of the audio controlled device) to unnecessarily wake up from a low power mode (thus increasing power consumption) to attempt to identify commands not forthcoming in the audio stream. Conversely, FRs require a target sound activity to be repeated in order to be identified by an audio spotting system (such as a user being required to repeat speaking the keyword so that it can be identified by a KWS), which causes latency and otherwise negatively impacts the user experience (such as by the user becoming frustrated by needing to repeat keywords). As such, it is desirable for the audio spotting system to correctly identify target sound activity (such as spotting keywords) with high accuracy to provide a satisfactory user experience. In using a simplified algorithm by an audio spotting system, there is a tradeoff between the number of FAs and a FR rate (FRR, which is the number of FRs divided by the total number of keywords or other defined audio events that exist in the audio stream over a period of time) cause by using the simplified algorithm. In other words, the simplified algorithm may be tuned to either cause a high FA number or a high FRR. As such, there is a need for an audio spotting system that conserves power and also reduces the number of FA and the FRR to improve the user experience for an audio controlled device. As used herein, "audio activity," "target audio activity," "sound activity," "target sound activity," "audio event," and "sound event" may be used interchangeably.

A new audio spotting system and operation thereof is proposed herein to increase performance while reducing power consumption. In some implementations, an audio spotting system for spotting specific audio activity or events (such as one or more spoken keywords) includes multiple modules configured and to operate in a cascade manner such that later modules are used only based on the operation of prior modules. For example, if an initial module does not identify an audio activity (such as a spoken keyword), a later module does not activate from a low power mode to an active mode to process the audio stream to identify an audio activity. A sound activity is spotted only when the last module in the cascade design identifies the sound activity. The modules in the cascade design are arranged from lower power consuming modules (with lower desired performance, such as a higher FA) to higher power consuming modules (with higher desired performance, such as lower FA and a low FRR) to reduce power consumption during operation of the overall cascade audio spotting system while ensuring a desired overall performance in spotting keywords or other audio events. As disclosed herein, the cascade audio spotting system is configured to detect a target audio event (e.g., a spoken keyword) when all of the cascaded modules have identified an audio activity defined for the module. Having all the modules in a cascade arrangement effectively creates an "AND" logic between the modules, which reduces the chance of FA by the overall cascade audio spotting system.

While the following examples are described with reference to a cascade KWS as an example cascade audio spotting system for identifying keywords in one or more audio streams for clarity, aspects of the present disclosure may be used to identify any type of audio event or activity (such as sounds from other devices, a dog barking, and so on). As such, "KWS" and "audio spotting system" may be used interchangeably herein unless specifically stated otherwise. In addition, "identifying" an audio activity (such as a keyword) may also be referred to as "spotting," "detecting," and the like. Furthermore, "keyword" may refer to one word or a string of words (such as a predefined phrase used to wake up an audio controlled device).

FIG. 1 illustrates an example operating environment 100 in which an audio spotting system (such as a KWS) may operate. The operating environment 100 includes an audio controlled device 105 (which may include the audio spotting system), an audio source 110, and one or more noise sources 135-145. In the example illustrated in FIG. 1, the operating environment 100 is illustrated as a room, but it is contemplated that the operating environment may include other environments, such as an inside of a vehicle, an outdoor stadium, an airport, etc. In accordance with various implementations, the audio controlled device 105 may include or be coupled to one or more audio sensing components (such as microphones 115*a*-115*d*) and may include or be coupled to one or more audio output components (such as loudspeakers 120*a*-120*b*). To note, a "speaker" as used herein may refer to a loudspeaker, a person speaking, or another suitable sound emitting object in the environment of the audio spotting system.

The audio controlled device 105 may use the microphones 115*a*-115*d* to sense sound and generate one or more audio streams. For example, each microphone may be used to generate an analog audio stream. In this manner, four audio streams may be generated using the four microphones 115*a*-115*d*. The audio streams may be independent signal streams or may be combined into one or more combined signal streams. The audio streams may be represented as a multichannel signal comprising two or more audio input signals. The audio controlled device 105 may process the audio streams using the cascade audio spotting system disclosed herein, such as a cascade KWS to identify a spoken keyword received from an audio source 110. After a keyword is spotted in one or more of the audio streams, the audio controlled device 105 is configured to wake up from a low power mode to an active mode and further process the one or more audio streams including the keyword. For example, a speech recognition engine or voice command processor of the audio controlled device 105 may receive the one or more audio streams to identify voice commands subsequent to the keywords to cause the audio controlled device 105 to perform one or more operations. In another example, the audio controlled device 105 may wake up from the low power mode to an active mode to transmit the one or more audio streams to an external device (such as to a cloud computing system or a remote server) configured to further process the one or more audio streams. Thus, the audio controlled device 105 may be a standalone device that converts specific audio signals into one or more operations to be performed (e.g., a command, an instruction, etc. for interacting with or controlling a device) or may be a device that acts as a gatekeeper that identifies sound activity in specific audio streams before transmitting the specific audio streams for further processing. The audio controlled device 105 may be any suitable electronic device, such as a consumer electronic device (e.g., a mobile phone, tablet, personal computer, and so on), an IoT device (such as a voice activated microwave, television, motion sensor, light switch, and so on), a voice controlled automobile, a voice controlled audio or audio/video device (such as a smart speaker or a smart display), and so on.

The audio source 110 may be any source that produces an audio that is detectable by the audio controlled device 105, such as a person uttering a keyword, a door knock, a doorbell, a dog barking, the television 140, the loudspeaker 135, other persons in the environment, and so on. An audio of interest may include target audio activity (such as a spoken keyword) to be identified by the audio spotting system. The audio of interest may be defined based on criteria specified by user or system requirements. In the illustrated example, the audio of interest is defined as human speech, and the audio source 110 is a person. Other audio that is not of interest may be referred to as noise. If the person 110 is the only source for audio in the environment 100, components 135-145 may be conceptually considered as noise sources. As described herein, an audio controlled device 105 may be configured to spot target audio activity, which may be included in the audio from an audio source. Target audio activity may include any audio event to be detected by the audio controlled device 105, such as a spoken keyword, a voice command, a dog barking, or other audio events.

It is noted that audio from different sources may reach the microphones **115*a*-115*d* of the audio processing device 105 from different directions. For example, the noise sources 135-145 may produce noise at different locations within the room, and the audio source 110 (e.g., a person) may speak while moving between locations within the room. Furthermore, audio may reflect off fixtures (e.g., walls) within the room (such as depicted for the audio from source 110). For example, audio may directly travel from the audio source 110 to the microphones 115*a*-115*d*, respectively. Additionally, audio from the audio source 110 may reflect off the walls 150*a* and 150*b* and reach the microphones 115*a*-115*d* indirectly. As will be described below, the audio controlled device 105 may use one or more audio processing techniques to estimate a location of an audio source (such as the audio source 110) based on the audio received by the microphones 115*a*-115*d*. In addition, the audio controlled device 105** may estimate and remove echo and reverberation and process the audio streams to enhance the audio and suppress noise (such as described below).

For the audio controlled device 105 to conserve power, the audio controlled device 105 may be in a low power mode while the audio spotting system of the audio controlled device 105 remains in an active mode. For example, a main processing system, wireless transceiver, and other components of the audio controlled device 105 may be in a low power mode until an audio activity (such as a keyword) is spotted in one or more audio streams from the microphones **115*a*-115*d* by the audio spotting system. In this manner, one or more of the microphones 115*a*-115*d* remain in an active mode along with the audio spotting system while the audio controlled device 105 is in the low power mode. An example audio controlled device 105 is described in more detail below with reference to FIG. 2**.

Figure 2:
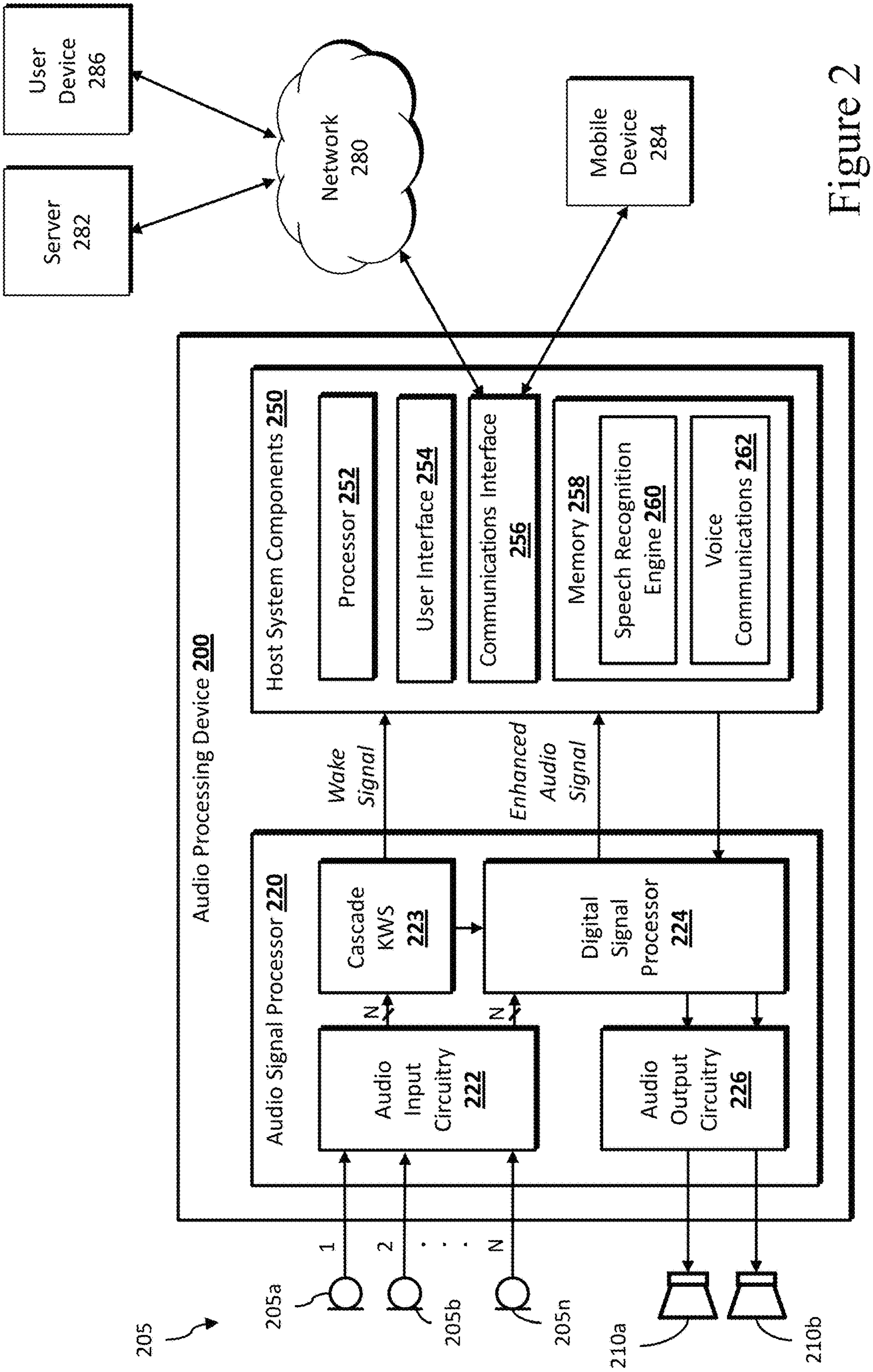
FIG. 2 illustrates a block diagram of an example audio processing device.

FIG. 2 illustrates a block diagram of an example audio processing device 200. The audio processing device 200 may be an example implementation of the audio controlled device 105 in FIG. 1. The audio processing device 200 may be any suitable device to receive and enhance audio data. For example, the audio processing device 200 may include a mobile phone, a smart speaker, a smart display, a tablet, a personal computer, a voice-controlled appliance, an automobile, or other suitable device. In the illustrated embodiment, the audio processing device 200 includes an audio signal processor 220 and host system components 250. In some implementations, the audio processing device 200 may also include one or more of an audio sensor array 205 including microphones **205*a*-205*n* or loudspeakers 210*a* and 210*b*. While two loudspeakers are shown, any number of loudspeakers may be included or coupled to the audio processing device 200** (such as three or more loudspeakers or no loudspeakers).

The audio sensor array 205 comprises N sensors (with integer N greater than or equal to 1), each of which may be implemented as a transducer that converts audio in the form of sound waves received at the sensor into an audio stream (which may also be referred to as an audio signal). In the illustrated environment, the audio sensor array 205 includes a plurality of microphones **205*a*-205*n*, each generating an audio stream which is provided to the audio input circuitry 222 of the audio signal processor 220**. In some implementations, each microphone generates an analog audio stream.

The audio signal processor 220 includes the audio input circuitry 222, a cascade KWS 223 (or other suitable cascade audio spotting system), a digital signal processor (DSP) 224, and optional audio output circuitry 226. The audio signal processor 220 may be implemented in a combination of hardware and software. For example, the audio signal processor 220 may be implemented as one or more integrated circuits including analog circuitry and digital circuitry. One or more processors of the audio signal processor 220 (such as the digital signal processor 224) may be configured to execute instructions stored in a memory. The term "processor," as used herein, may refer to one or more of a general purpose processor, conventional processor, controller, microcontroller, or state machine capable of executing scripts or instructions of one or more software programs stored in memory. The term "memory," as used herein, may refer to a non-transitory processor-readable storage including one or more of a random access memory (RAM) such as synchronous dynamic random access memory (SDRAM), read only memory (ROM), non-volatile random access memory (NVRAM), electrically erasable programmable read-only memory (EEPROM), FLASH memory, or other known storage media.

The audio input circuitry 222 may include a front end to interface with the audio sensor array 205 (such as to obtain one or more audio streams from the microphones **205*a*-205*n*) and perform one or more processing functions on the audio streams (such as anti-aliasing by an anti-aliasing filter block, analog-to-digital conversion of one or more audio streams by an analog-to-digital converter (ADC), echo cancellation circuitry, and so on). In some implementations, one or more of the processing functions may be included in the cascade KWS 223. The cascade KWS 223 receives the one or more audio streams from the audio input circuitry 222. In some implementations, the one or more audio streams may include one or more analog audio streams before digital conversion, one or more digital audio streams after conversion by an ADC, or a combination of both. For example, the ADC may be included in the cascade KWS 223, and the cascade KWS 223 receives the analog audio streams from the microphones 205*a*-205*n*, which may or may not have been processed by the audio input circuitry before being provided to the cascade KWS 223**.

As noted above, the cascade KWS 223 includes a plurality of audio detection modules to detect defined sound activities (such as one or more spoken keywords or other types of sound activity, such as described herein). The audio detection modules have different power consumption requirements, and the modules are configured to be activated in a cascade manner to conserve power consumption. In some implementations, portions of the cascade KWS 223 (such as one or more of the modules) may be implemented as part of the audio input circuitry 222 or as part of the DSP 224.

The cascade KWS 223 may detect a keyword in one or more audio streams and provide a wake signal (e.g., a "0" or "1" signal, an instruction, a dataset including a set bit flag, or other suitable signal) to one or more of the host system components 250, the DSP 224, or other device components when the keyword is detected. In some implementations, the cascade KWS 223 may provide a processed digital audio stream (such as after echo cancellation, multi-channel noise reduction (MCNR), or other processing) to the DSP 224 for further processing. For example, the DSP 224 may be configured to identify one or more voice commands subsequent to the keyword in the processed audio stream or may further enhance the processed digital audio stream for provision to the host system components 250 to identify one or more voice commands. As noted above, in some implementations, the cascade KWS 223 may be a cascade audio spotting system configured to detect a target audio event or activity other than a spoken keyword (such as an alarm, a dog barking, a patterned audio signal from a loudspeaker, etc.).

The DSP 224 may include one or more processors capable of processing the one or more audio streams to generate an enhanced audio signal, which is output to one or more host system components 250. In some implementations, the DSP 224 may be operable to perform echo cancellation, noise cancellation, signal enhancement, post-filtering, or other audio signal processing functions. The DSP 224 may also be configured to identify one or more voice commands or other audio events in the audio streams. The DSP 224 may also be configured to receive and process one or more signals from the host system components 250 for playback by the loudspeakers 210*a*-210*b*. The processed signals for playback are provided by the DSP 224 to the audio output circuitry 226. While the DSP 224 is depicted as separate from the cascade KWS 223, in some implementations, at least a portion of the DSP 224 and the cascade KWS 223 may be combined in one or more components (such as in the same integrated circuit).

The optional audio output circuitry 226 may include a front end to interface with the loudspeakers 210*a*-210*b*. The audio output circuitry 226 processes the audio signals received from the DSP 224 for output to at least one loudspeaker, such as loudspeakers 210*a* and 210*b*. In some implementations, the audio output circuitry 226 may include a digital-to-analog converter (DAC) that converts one or more digital audio signals to analog and one or more amplifiers for driving the loudspeakers 210*a*-210*b*.

In some implementations, one or more of the sensor array 205 or at least one of the loudspeakers 210*a*-210*b* may be included in the audio processing device 200. For example, a smart speaker (such as a Google® Home or Amazon® Alexa device) may include one or more microphones and one or more loudspeakers. In some implementations, the audio processing device 200 may be coupled to one or more external loudspeakers or one or more external microphones.

The host system components 250 may comprise various hardware and software components for operating the audio processing device 200. In the illustrated embodiment, the system components 250 include a processor 252, a user interface 254, a communications interface 256, and a memory 258. While not shown, one or more of the host system components 250 may be configured to interface and communicate with the audio signal processor 220 and other host system components 250 via a bus. In addition or to the alternative, one or more components and the audio signal processor 220 may be configured to communicate over one or more dedicated communication lines.

The processor 252 may include one or more processors for executing software instructions to cause the audio processing device to perform various operations. For example, the processor 252 may be configured to execute an operating system, a smartphone or smart speaker application stored in memory 258, the speech recognition engine 260 to identify one or more voice commands or perform other spoken language processing, and so on.

It will be appreciated that although the audio signal processor 220 and the host system components 250 are shown as incorporating a combination of hardware components, circuitry, and software, in some implementations, at least some or all of the functionalities that the hardware components and circuitries are operable to perform may be implemented as software modules being executed by the processor 252, the DSP 224, or another suitable processor of the device 200. Such software modules may include software instructions or configuration data and may be stored in the memory 258, a firmware of the one or more processors, or another suitable memory of the device 200.

The memory 258 may be implemented as one or more memory devices operable to store data and information, including audio data and program instructions. In some implementations, the memory 258 stores software instructions for execution by the processor 252 or another suitable processor of the device 200 (such as the DSP 224). Memory 258 may include one or more various types of memory devices including volatile and non-volatile memory devices, such as RAM (Random Access Memory), ROM (Read-Only Memory), EEPROM (Electrically-Erasable Programmable Read-Only Memory), flash memory, hard disk drive, or other types of memory.

As noted above, the processor 252 may be operable to execute software instructions stored in the memory 258. In some implementations, a speech recognition engine 260 is executed to process the enhanced audio signal received from the audio signal processor 220, including identifying and executing voice commands. Voice communications components 262 may be executed to facilitate voice communications (or other types of communications) with one or more external devices (such as a mobile device 284 or a user device 286, which may be coupled to the device 200 via a network 280) via the communications interface 256. The communications interface 256 may be a wired or wireless interface to communicate with one or more external devices. For example, the communications interface 256 may be a wireless interface to communicate directly with the mobile device 284 via Wi-Fi Direct, BLUETOOTH® (Bluetooth), or another suitable communication protocol and to communicate with a user device 286 and a server 282 via the network 280. An example network 280 may include any suitable network, such as a cellular network, a wireless or wired local area network, or a wide area network. In some implementations, the server 282 or the user device 286 may be coupled to the device 200 via the internet. In some implementations, communications may include transmission of the enhanced audio signal to an external communications device (such as the server 282) for further processing. The communications interface 256 may include any suitable wired or wireless communications components facilitating direct or indirect communications between the audio processing device 200 and one or more other devices.

The user interface 254 one or more components to allow a user to interface with the device 200. The user interface 254 may include a display, a touchpad display, a keypad, one or more buttons, or other input/output components operable to enable a user to directly interact with the audio processing device 200. In some implementations, the user interface 254 may include the microphones 205*a*-205*n* and the loudspeakers 210*a*-210*b*. In some implementations, the user interface 254 may include a graphical user interface (GUI) displayed on a display coupled to or included in the audio processing device 200.

Aspects of the present disclosure are described below with reference to the audio processing device 200. In particular, a cascade audio spotting system (such as the cascade KWS 223) included in the audio processing device is described as performing aspects of the present disclosure. However, any suitable cascade audio spotting system and audio processing device incorporating the cascade audio spotting system may be used to perform aspects of the present disclosure.

Figure 3:
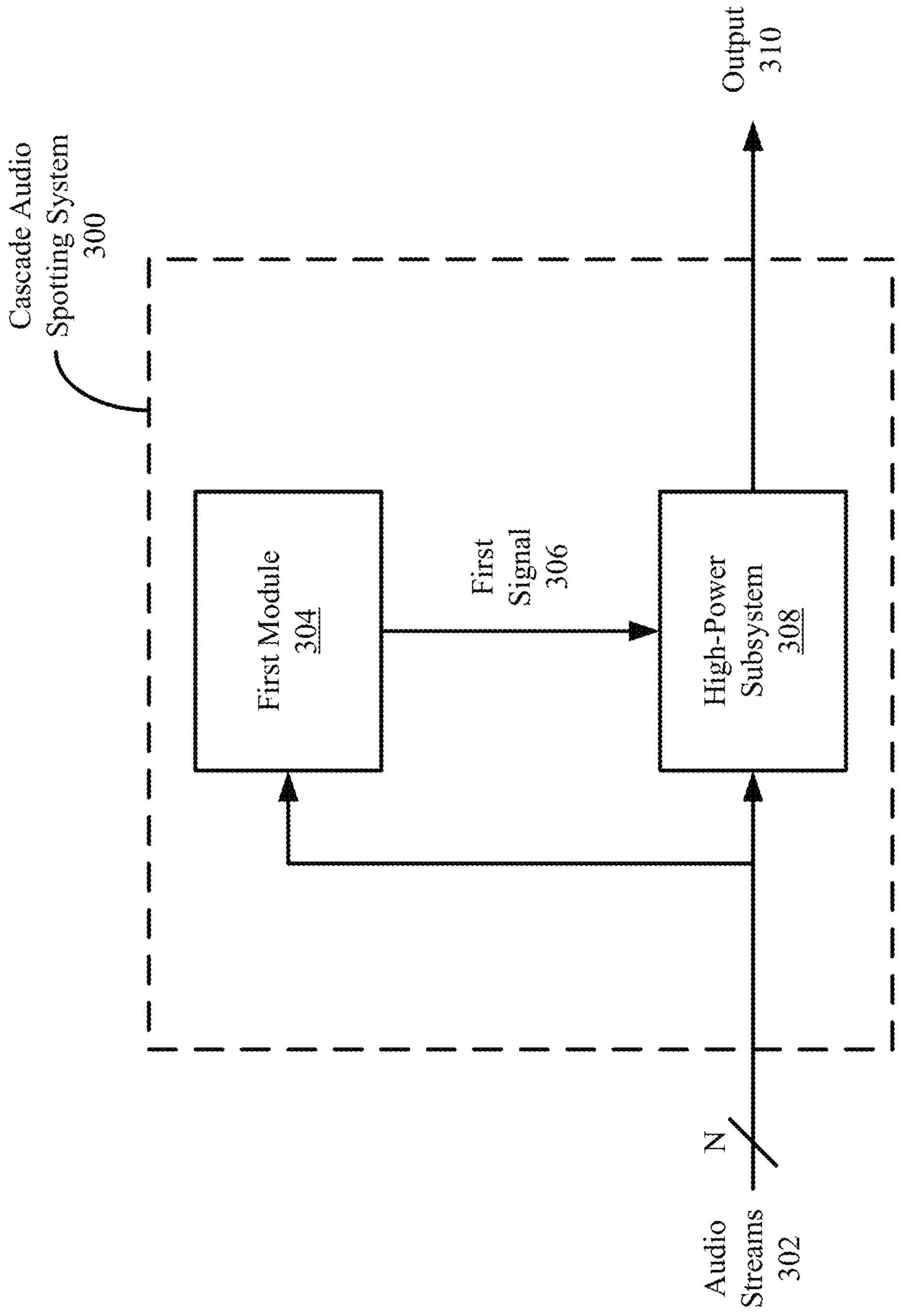
FIG. 3 illustrates a block diagram of an example cascade audio spotting system.

FIG. 3 illustrates a block diagram of an example cascade audio spotting system 300. The cascade audio spotting system 300 is configured to receive the one or more audio streams 302 and detect a target sound activity in the one or more audio streams 302. For example, the cascade audio spotting system 300 may be an example implementation of the cascade KWS 223 to detect a spoken keyword in the one or more audio streams. The audio streams 302 include N number of audio streams (with integer N greater than or equal to 1). The audio streams 302 may include one or more analog streams, one or more digital streams, or a combination of the two. For example, the audio streams 302 may include one or more of the analog audio streams from the microphones 205*a*-205*n* or one or more digital audio streams after converting the analog audio streams by an ADC.

The cascade audio spotting system 300 includes a first module 304 and a high-power subsystem 308. The subsystem 308 being "high-power" refers to the power consumption of the subsystem 308 in an active mode being higher than the power consumption of the first module 304 in an active mode. While two modules 304 and 308 are depicted as being included in the cascade audio spotting system 300 in FIG. 3, a cascade audio spotting system may include any suitable number of modules (such as two or more modules). For example, the cascade audio spotting system 300 may include three modules or four modules. A more detailed example of a cascade audio spotting system including four modules is described in more detail herein.

Figure 4:
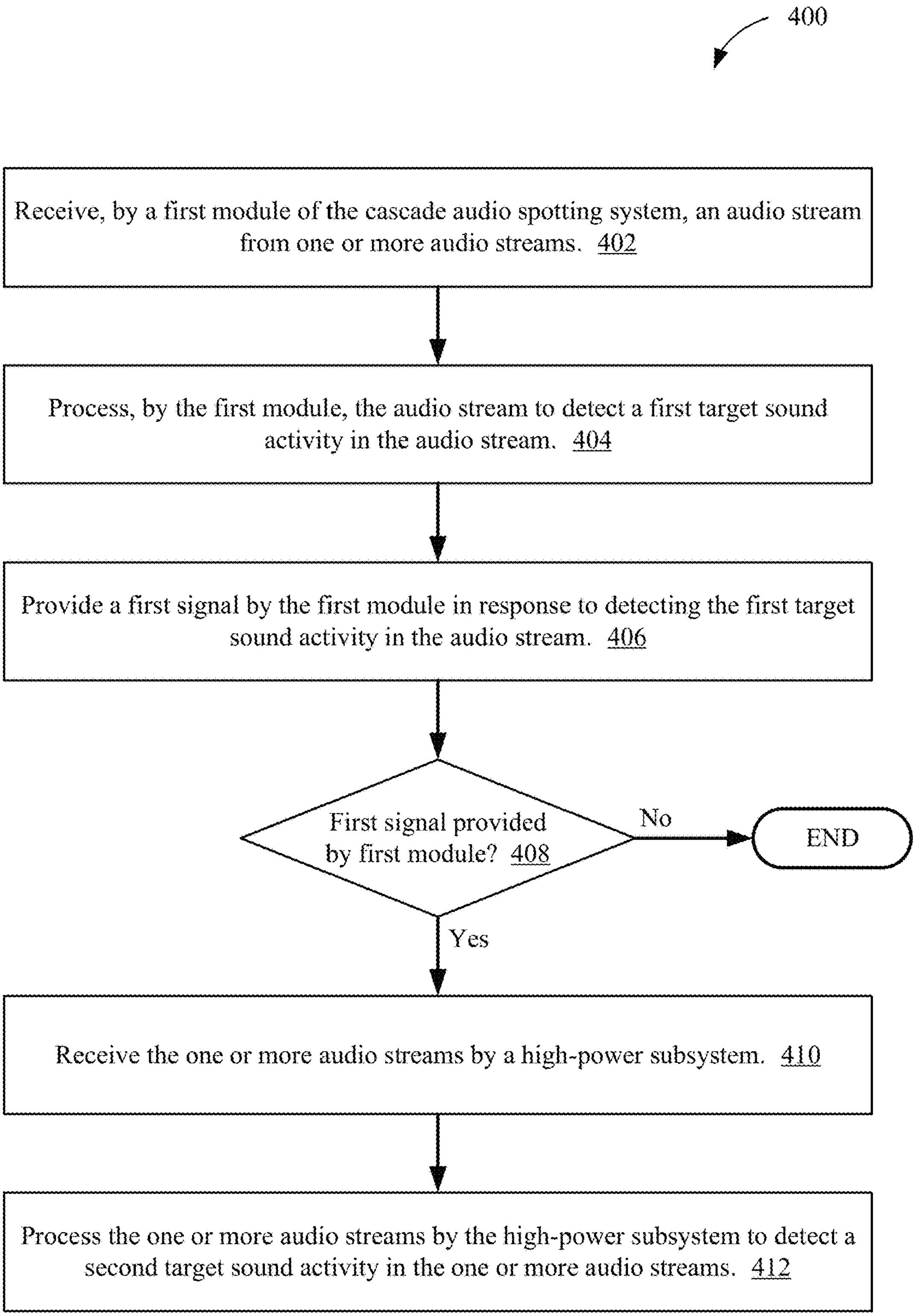
FIG. 4 illustrates a flow chart depicting an example operation of a cascade audio spotting system.

Example operation of the cascade audio spotting system 300 is described below with reference to FIG. 4. FIG. 4 illustrates a flow chart depicting an example operation 400 of the cascade audio spotting system 300. While the example operation 400 is described as being performed by the cascade audio spotting system 300, any suitable cascade audio spotting system (such as a cascade KWS) may perform the example operation 400.

At 402, the first module 304 of the cascade audio spotting system 300 receives an audio stream from the one or more audio streams 302. As noted above, the one or more audio streams 302 may include the audio streams from one or more microphones in analog form or in digital form (such as after conversion by an ADC). At 404, the first module 304 processes the audio stream to detect a first target sound activity. A first target sound activity may include dynamic noise outside of static noise that exists in an environment, the existence of a voice or spoken language, a keyword, or other defined sounds that may be detected by the first module. Detecting the first sound activity may be performed in any suitable manner and for any suitable type of first sound activity, such as described in more detail below.

At 406, the first module 304 provides a first signal in response to detecting the first target sound activity in the audio stream. The first signal may be any suitable signal to indicate that the first target sound activity is detected in the received audio stream. For example, the first signal may be a high ("1") value of a binary signal, with a low ("0") value indicating that the first sound activity is not detected and the high ("1") value indicating that the first target sound activity is detected. In another example, an output of the first module 304 may include a bit flag to indicate if the first target sound activity is detected (such as 0 indicating that the first target sound activity is not detected and 1 indicating that the first target sound activity is detected). In a further example, a unique signal pattern or other indicator may be provided by the first module 304 to indicate that the first target sound activity is detected. In some implementations, the timing of the first signal indicating that the first target sound activity is detected (such as switching from 0 to 1 of a binary signal or providing the bit flag at 1) corresponds to the portion of the audio stream including the first target sound activity. For example, if the audio stream is a digital audio stream including a sequence of temporal audio frames, the timing of the first signal corresponds to a specific window of audio frames in the sequence of audio frames. While not shown, the one or more audio streams 302 received by the high-power subsystem 308 may be buffered so that the timing of the first signal 306 and the audio streams 306 to the high-power subsystem 308 is synchronized. For example, the audio input circuitry 222 may include one or more queues or buffers configured to receive the audio streams from the microphones 205*a*-205*n* (or from an ADC converting the audio streams from the microphones 205*a*-205*n*) and time when to provide the audio streams to a high-power subsystem of the cascade KWS 223.

At decision block 408, if the first signal is not provided by the first module 304, operation 400 ends without the high-power subsystem being used to detect a target sound activity. For example, the first module 304 may output a 0 value signal indicating that the first target sound activity is not detected. In another example, an output from the first module 304 may include a bit flag set to 0 to indicate that the first target sound activity is not detected. Such an output indicates that the high-power subsystem 308 is not to perform any operations to attempt to detect a target sound activity in the one or more audio streams. While not shown, steps 402-406 may be performed recursively by the first module 304 as the audio stream continues to be received at the first module 304.

If the first signal is provided by the first module 304 (such as the first module 304 outputting a 1 value signal or setting a bit flag to indicate that the first target sound activity is detected), the high-power subsystem 308 receives the one or more audio streams 302 (410). In some implementations, receiving the one or more audio streams may include the audio streams being placed into one or more buffers or queues or other components of the high-power subsystem 308 for processing. For example, the one or more audio streams received by the high-power subsystem 308 are digital audio streams from an ADC. Each audio stream may include a sequence of audio frames placed into a first in first out buffer (FIFO) of the high-power subsystem 308. If the one or more audio streams are not to be received by the high-power subsystem 308, the digital audio frames of the audio streams transmitted to the high-power subsystem 308 from an ADC may be dropped or may not be transmitted by the ADC.

At 412, the high-power subsystem 308 processes the one or more audio streams to detect a second target sound activity in the one or more audio streams. The second target sound activity may be the same or different than the first sound activity. For example, the first module 304 may be a lower power module that is configured to detect a keyword with a high number of FAs to ensure a low FRR, and the high-power subsystem 308 may verify if a detected keyword is also detected by the high-power subsystem 308 with a lower number of FAs and a low FRR (such as based on a quality control threshold associated with FAs or FRs). In this manner, the first target sound activity may be the same as the second target sound activity. In another example, the first module 304 may be a lower power module to detect the existence of speech in an audio stream, and the high-power subsystem 308 may detect whether the speech in the audio stream (or in other audio streams) includes a keyword. In this manner, the first target sound activity may differ from the second target sound activity.

The output 310 of the high-power subsystem 308 may be any suitable output associated with detecting the second target sound activity. For example, the output 310 may include an indication of if the second target sound activity is detected. In another example, the output 310 may include one or more processed audio streams including the second target sound activity if the second target sound activity is detected. In a specific example, if a processed audio stream is provided by the high-power subsystem of the cascade KWS 223 in response to detecting a keyword, the DSP 224 or the host system components 250 (FIG. 2) may process the provided audio stream to attempt to detect one or more voice commands following the detected keyword in the audio stream.

As noted above, the high-power subsystem 308 is not to attempt to detect the second target sound activity if the first module 304 does not detect the first target sound activity. In some implementations, the high-power subsystem 308 may be in a low power mode when not in use. A "low power mode" may refer to one or more components being placed into a sleep state, being placed into a reduced operation state, having power removed, or otherwise configured to consume less power when the high-power subsystem 308 is not to detect the second target sound activity (such as when the first signal is not provided by the first module 304). In response to the first signal being provided by the first module 304, the high-power subsystem 308 may switch from the low power mode to an active mode to attempt to detect the second target sound activity. For example, the first signal 306 from the first module 304 may act as a wake-up signal to the high-power subsystem 308 for the high-power subsystem 308 to receive the one or more audio streams 302 and process the audio streams to detect a second target sound activity.

As noted above, the first module 304 may be any suitable hardware, software, or combination of the two to detect a target sound activity. In some implementations, the first module 304 may include one of: an analog voice activity detector (VAD), a digital VAD, or a low-power trigger. A trigger being "low-power" refers to the trigger being configured to consume less power than one or more components of the high-power subsystem (such as a high-power trigger of the high-power subsystem, as described below). While the term VAD implies that a speaker's voice is to be detected, a VAD may be configured to detect any suitable target sound activity or audio event (such as the presence of dynamic audio, the presence of a voice, the presence of a keyword, the presence of a dog barking, a patterned audio from a loudspeaker, and so on).

If the first module 304 includes an analog VAD, an analog VAD may be any suitable VAD configured to receive an analog audio stream and process the analog audio stream to detect a target sound activity. In some implementations, the target sound activity is the presence of dynamic sound in the environment (but may be any other suitable audio event). For example, if the environment is silent (such as having a volume less than a threshold decibel level), the analog VAD is to detect the presence of any sound in the environment (such as being greater than the threshold decibel level). In another example, if the environment includes a static noise (such as a fan or other consistent noise), the digital VAD is to detect a variation in sound from a baseline volume level including the static noise (such as a decibel threshold amount greater than the baseline volume level). In some implementations, the analog VAD conceptually may use a rate of change in signal intensity over an amount of time in the analog audio stream to determine if the change is greater than a threshold. The analog VAD may provide a signal indicating the presence of a dynamic sound being detected. The signal may be any suitable implementation of the first signal 306 described above.

In some implementations, the analog VAD may be fully analog, signal-to-noise ratio (SNR)-based detection circuits based on an energy-efficient analog implementation with continuous time non-linear operation and fully-passive switched-capacitor signal processing to allow the reduction of both power consumption and layout size. The analog VAD may be implemented in a complementary metal-oxide-semiconductor (CMOS) integrated circuit (IC). Example implementations of an analog VAD are described in Lorenzo Crespi, Marco Croce, et al "Analog Voice Activity Detector Systems and Methods," U.S. Pat. No. 11,087,780, and Marco Croce, Brian Friend, Francesco Nesta, Lorenzo Crespi, Piero Malcovati, Andrea Baschirotto, "A 760-nW, 180-nm CMOS Fully Analog Voice Activity Detection System for Domestic Environment" IEEE J. Solid State Circuits 56(3): 778-787, both of which are incorporated by reference in their entirety as if set forth herein.

If the first module 304 includes a digital VAD, a digital VAD may be any suitable VAD configured to receive a digital audio stream and process the digital audio stream to detect a target sound activity. For example, an ADC may convert one or more analog audio streams generated using the one or more microphones, and one of the one or more audio streams may be provided to the digital VAD. In some implementations, the target sound activity is the presence of speech in the audio stream (but may be any other suitable audio event). For example, if the environment includes sound (such as a dynamic sound), the digital VAD is to detect whether the sound includes speech. The digital VAD may include a defined statistical model, a trained machine learning (ML) model, or any other suitable detection model to detect the presence of speech.

For the ML models described herein, any suitable type of ML model may be used. For example, an ML model may be based on random forests, decision trees, gradient boosted trees, logistic regression, nearest neighbors, control flow graphs, support vector machines, naïve Bayes, Bayesian Networks, value sets, hidden Markov models, or neural networks configured to generate a prediction. For the digital VAD, the prediction may be a probability or an indication as to the presence of speech in the digital audio stream. If a probability is greater than a detection threshold, the digital VAD may detect the presence of speech. In some implementations, the digital VAD may include a neural network trained to detect speech. The digital VAD may provide a signal indicating the presence of speech being detected. The signal may be any suitable implementation of the first signal 306 described above.

Training the ML model may be based on supervised or unsupervised learning. For example, training data including a plurality of previously collected digital audio streams with and without speech may be provided to the ML model to train the ML model to detect the presence of speech. For supervised learning, each digital audio stream may be labeled as to whether the stream includes speech, and the labels are used to train the ML model such that the error in detecting speech over the training data is less than a desired threshold. For supervised learning of ML models to be used to detect a sound event other than speech, the labels may correspond to the sound event to be detected. In some implementations, the Adam optimization algorithm may be used to train an ML model with the training data.

A detection model may include one or more hyperparameters that may be used to configure the detection model. As used herein, a hyperparameter is any parameter value or setting used to define the implementation of one or more detection models to detect an audio event. Example hyperparameters for a detection model may include one or more of a detection threshold to detect a target sound activity, a learning rate for an ML model, values defining the ML model after training, or a defined statistical value for a statistical model (such as a mean, a median, a standard deviation, or another statistical value). As is described in more detail below regarding ensembling a plurality of detection models to detect a target sound activity, example hyperparameters may also include an ensemble threshold associated with the plurality of detection models.

In some implementations, a detection model generates a probability (p) that the detection model detected a target sound activity. For example, the detection model may generate a value from 0 to 1 indicating a probability that target sound activity is detected in an audio stream. To determine whether the detection model detects a target sound activity, probability p is compared to a detection threshold (DT) associated with the detection model. In this manner, the target sound activity is detected if p is greater than or equal to DT. To note, DT may be any suitable value, and may be configured by any suitable entity (such as the device manufacturer, a software provider for the detection model, a user, and so on). The DT may be static or may be adjustable for use in detecting a target sound activity.

Referring back to a digital VAD specifically, example implementations of a digital VAD are described in Saeed Mosayyebpour, Francesco Nesta "Voice Activity Systems and Methods" U.S. Pat. No. 10,504,539, the contents of which are incorporated by reference in their entirety as if fully set forth herein.

In some implementations, the cascade audio spotting system may include both an analog VAD and a digital VAD in sequence. For example, the digital VAD may be a later module that is in a low power mode while the analog VAD remains in an active mode to detect the presence of a dynamic sound. If dynamic sound is not in the environment, the digital VAD is not needed to detect the presence of speech. With the digital VAD in a low power mode, the cascade audio spotting system is able to conserve power while no dynamic sounds are detected. The signal from the analog VAD indicating the presence of dynamic sound in an analog audio stream may be used as a wake-up signal to activate the digital VAD from the low power mode to an active mode. In the active mode, the digital VAD attempts to detect the presence of speech in a digital audio stream. In some implementations, an ADC to convert the analog audio streams may also be in a low power mode, and the signal from the analog VAD may be used as a wake-up signal to activate the ADC. In this manner, the ADC activates from a low power mode in response to an indication from the analog VAD and generates the digital audio stream provided to the digital VAD by converting one or more analog audio streams to one or more digital audio streams.

If activation of the digital VAD is based on an indication from the analog VAD that a specific sound activity is detected by the analog VAD (such as the presence of sound), a signal from the digital VAD indicating a specific sound activity is detected by the digital VAD (such as the presence of speech) also indicates that the analog VAD detected a specific sound activity (such as the presence of dynamic sound). With the digital VAD being cascaded with the analog VAD, the signal from the digital VAD is a logical AND of the detection by the analog VAD and the detection by the digital VAD.

If the first module includes a low-power trigger, a low-power trigger includes one or more detection models to identify a target sound activity in a digital audio stream. As described above with reference to the digital VAD, a detection model may be any suitable model to detect a sound activity. In some implementations, the low-power trigger is configured to detect one or more spoken keywords in a digital audio stream, but the low-power trigger may be configured to detect any suitable target sound activity. The low-power trigger may be implemented using one or more processors executing instructions, one or more special purpose or integrate circuits, software stored in memory and executed by one or more processors, or a combination of hardware and software. In the examples below, the term "low-power trigger" may refer to the hardware performing the operations of the low-power trigger. A detection model being included in a low-power trigger may refer to a detection model being implemented in software and executed by the low-power trigger (such as one or more processors of the low-power trigger if the low-power trigger is implemented in hardware or one or more processors executing the software associated with the low-power trigger if the low-power trigger is implemented in software).

If the low-power trigger includes a plurality of detection models, each detection model may be better suited to detect a target sound activity in different circumstances. For example, one model may be better suited for noisy environments while another model may be suited for shorter length or noisier target sound activities (such as a person speaking faster or slurring some consonants when speaking one or more keywords). In some implementations, the low-power trigger may be configured to indicate that a spoken keyword is detected if any of the detection models detect the spoken keyword. For example, each detection model 1-x may generate a probability p1-px, and each probability p1-px may be compared to an associated detection threshold DT1-DTx. In this manner, a signal from the low-power trigger indicating that the low-power trigger identifies a target sound activity (such as a spoken keyword) may be based on a logical OR'ing of the outputs of the plurality of detection models indicating whether a target sound activity was detected by the model. In some other implementations, the low-power trigger may be configured to detect a target sound activity based on a defined number of detection models greater than 1 detecting the target sound activity (such as two or more, 40 percent of the detection models, and so on). To note, the low-power trigger is to have a low FRR (such as ideally being as close to zero percent as possible). In practice, the low-power trigger may be configured to have an FRR lower than a threshold for an acceptable FRR. Additionally or alternatively, lowering the FRR may be based on the number of FAs being kept below an acceptable maximum threshold. If the low-power trigger is configured to have a low FRR, the low-power trigger may have a higher number of FAs. For example, logically OR'ing the detection models' outputs instead of requiring a higher number of detection models to detect the target audio event may cause a lower FRR and a higher number of FAs. In some implementations, one or more hyperparameters of a detection model may be adjustable to decrease the FRR, which may increase the number of FAs. For example, a detection threshold for a detection model (such as each of DT1-DTx in the example above) may be lower to decrease the FRR, which may also increase the number of FAs. To note, any suitable hyperparameters (such as any suitable detection threshold) may be used for the low-power trigger.

The one or more detection models may be implemented in software that is stored in a memory of the audio processing device including the cascade audio spotting system (such as device 200). In implementing a detection model, the detection model and its associated hyperparameters may be stored in the memory. Many devices including the cascade audio spotting system may be lower power devices with limited storage, processing, and power resources. For example, some IoT devices may only have, e.g., 100 Kilobytes (KB) of memory available for implementing the cascade audio spotting system. Some IoT devices may also have lower end processors to conserve power, which may be provided by a battery. In some implementations, the one or more detection models is limited to being implemented in software stored in a small portion of the available memory (e.g., less than 30 KB of an available 100 KB). Reducing the amount of memory to be accessed for the low-power trigger reduces the amount of power consumed by the device. To further reduce power consumption, the low-power trigger may receive the digital audio stream from the ADC without any intermediate processing (such as any type of filtering) between the ADC and the low-power trigger. In this manner, the device does not consume power by processing the digital audio stream before being processed by the low-power trigger.

In some implementations, a cascade audio spotting system may include a combination of two or three of the analog VAD, the digital VAD, or the low-power trigger. For example, an analog VAD may be cascaded with the low-power trigger. The analog VAD, as the first module, may be active to detect a dynamic sound in an analog audio stream. As noted above, the analog VAD provides an indication (such as a binary signal or other suitable indication) that a dynamic sound is detected. The low-power trigger, which may be in a low power mode, may wake up from the low power mode to an active mode based on the indication from the analog VAD. In this manner, the low-power trigger may attempt to detect one or more spoken keywords in a digital audio stream in response to the analog VAD providing the indication.

In another example, a digital VAD may be cascaded with the low-power trigger. The digital VAD, as the first module, may be active to detect speech in a digital audio stream. As noted above, the digital VAD provides an indication (such as a binary signal or other suitable indication) that a speech is detected. The low-power trigger, which may be in a low power mode, may wake up from the low power mode to an active mode based on the indication from the digital VAD. In this manner, the low-power trigger may attempt to detect one or more spoken keywords in a digital audio stream in response to the digital VAD providing the indication. The digital audio stream provided to the digital VAD and the digital audio stream provided to the low-power trigger may be the same digital audio stream or different digital audio streams. In both examples above, the first signal 306 includes an indication from the low-power trigger as to whether a target sound activity (such as a spoken keyword) is detected in the digital audio stream). In some implementations, the cascade audio spotting system may include each of an analog VAD, a digital VAD, and a low-power trigger, such as depicted in FIG. 5.

Figure 5:
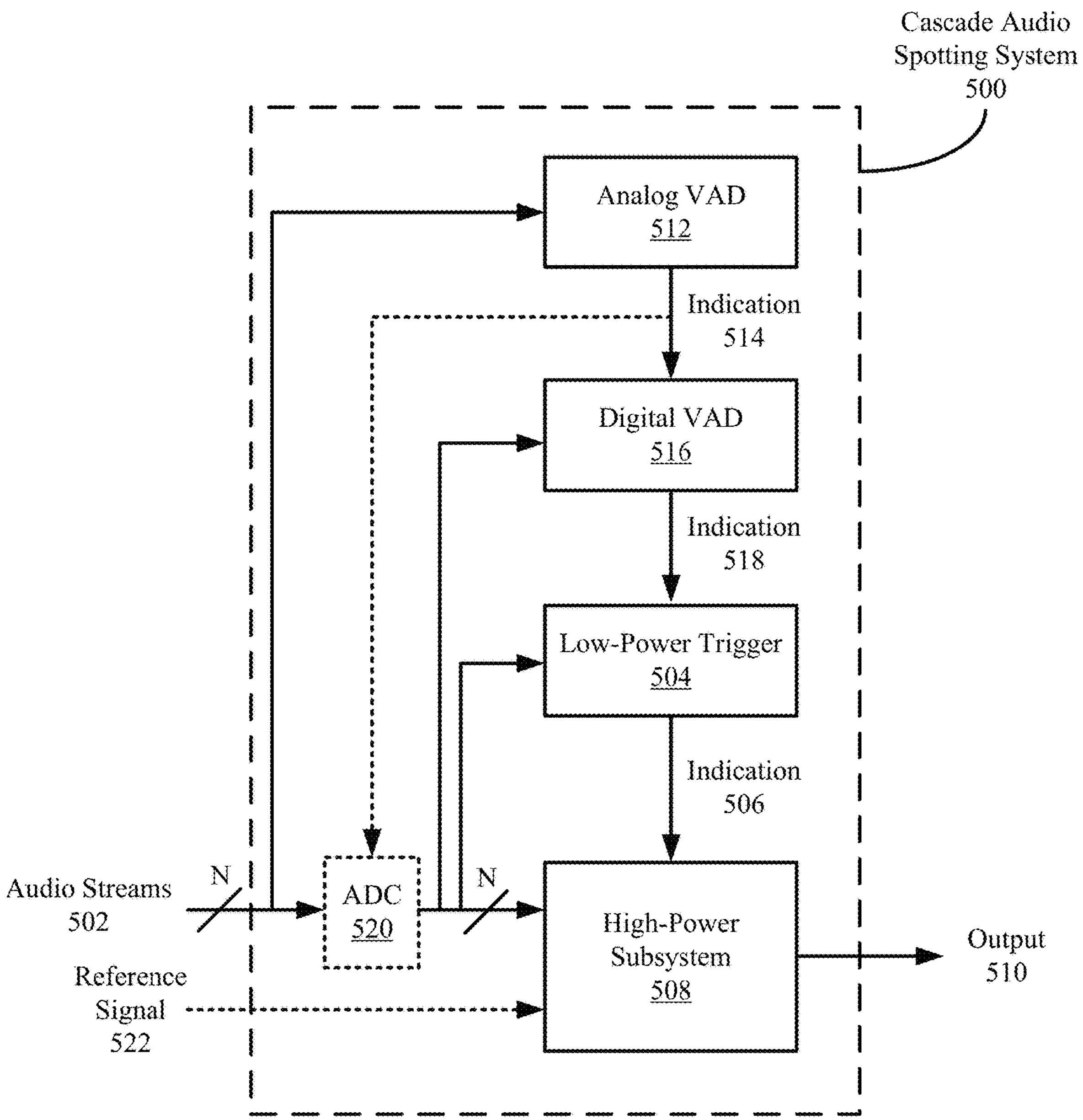
FIG. 5 illustrates a block diagram of an example cascade audio spotting system.

FIG. 5 illustrates a block diagram of an example cascade audio spotting system 500. The cascade audio spotting system 500 may be an example implementation of the cascade audio spotting system 300 in FIG. 3. For example, the first module 304 may include the low-power trigger 504, the high-power subsystem 308 may be the high-power subsystem 508, the first signal 306 may include the indication 506, the output 310 may be the output 510, and the audio streams 302 may include the audio streams 502.

As shown, the cascade audio spotting system 500 includes an analog VAD 512, a digital VAD 516, a low-power trigger 504, and a high-power subsystem 508. If the cascade audio spotting system 500 includes ADC 520, the audio streams 502 include N number of analog audio streams (with integer N greater than or equal to 1). The analog VAD 512 may be configured to detect whether an analog audio stream includes a dynamic audio signal, the digital VAD 516 may be configured to detect whether a digital audio stream includes a speech signal, and the low-power trigger 504 may be configured to detect one or more spoken keywords in a digital audio stream (e.g., the first target sound activity with reference to the cascade audio spotting system 300 may include one or more spoken keywords). The high-power subsystem 508 may also be configured to detect one or more spoken keywords in one or more digital audio streams. Operation of the cascade audio spotting system 500 is described below with reference to FIG. 6.

Figure 6:
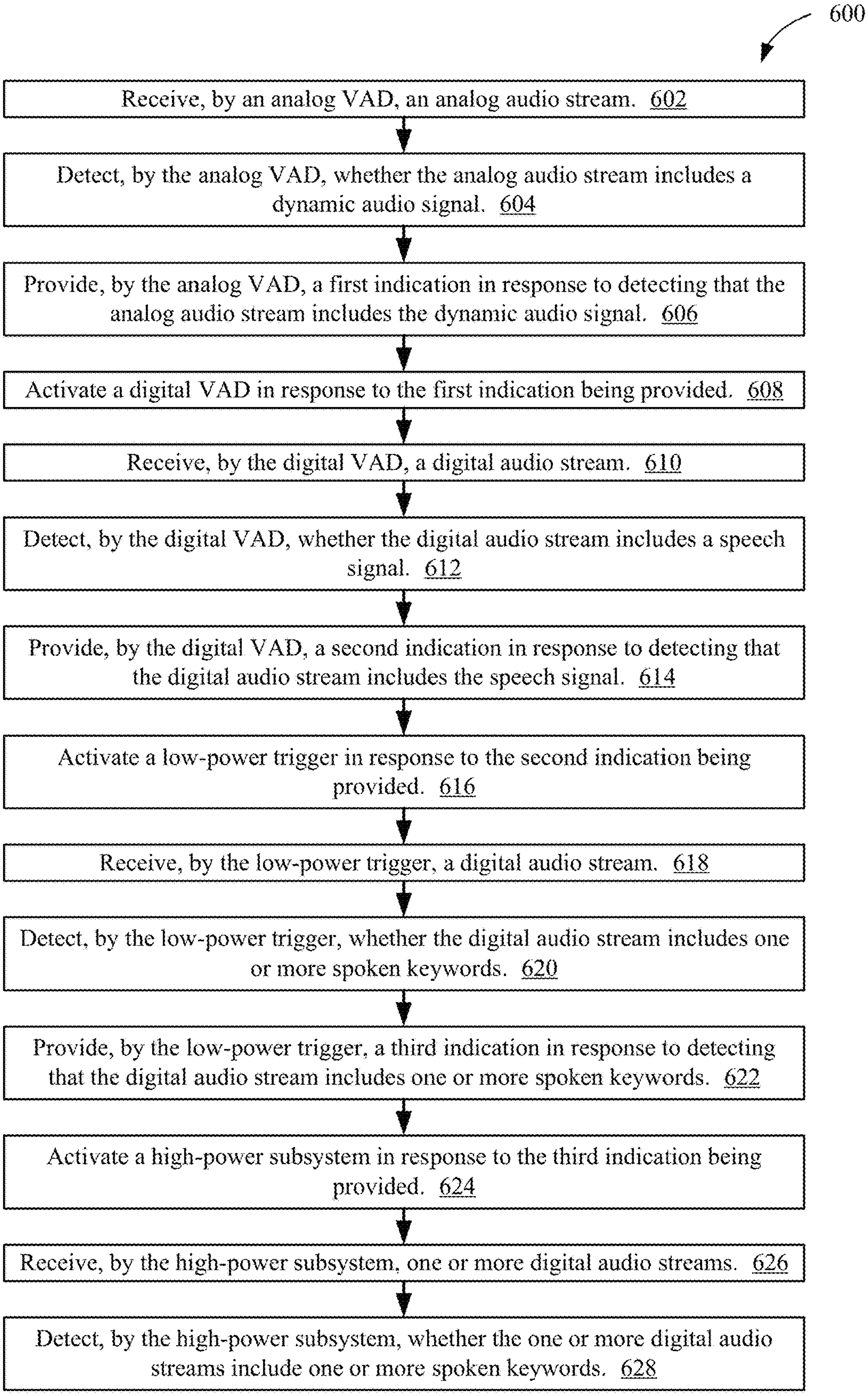
FIG. 6 illustrates a flow chart depicting an example operation of a cascade audio spotting system.

FIG. 6 illustrates a flow chart depicting an example operation 600 of a cascade audio spotting system. The example operation 600 is described as being performed by the cascade audio spotting system 500 in FIG. 5. At 602, the analog VAD 512 receives an analog audio stream from the one or more audio streams 502. At 604, the analog VAD detects whether the analog audio stream includes a dynamic audio signal. If a dynamic audio signal is detected, the analog VAD provides a first indication 514 in response to detecting that the analog audio stream includes the dynamic audio signal (606). For example, the indication 514 may be a binary signal, flag, or other suitable indication as to whether the analog audio signal is detected to include a dynamic audio signal.

At 608, the digital VAD 516 activates in response to the first indication 514 being provided. For example, the analog VAD 512 may be configured to continue detection of a dynamic audio signal in an analog audio stream, and the indication 514 may act as a wake-up signal to the digital VAD 516 that is in a low power mode when a dynamic audio signal is not detected. The indication 514 (such as a switch in a binary signal from low to high or a bit flag being set to 1) may cause the digital VAD 516 to activate from a low power mode to an active mode to begin receiving and processing a digital audio stream. In some implementations, the indication 514 may also be used as a wake-up signal to activate the ADC 520 if the ADC 520 is included in the cascade audio spotting system 500. In this manner, the ADC 520 may activate from a low power mode to an active mode to convert the one or more audio streams 502 from analog to digital in response to receiving the indication 514, and one of the one or more digital audio streams is provided to the digital VAD 516 that is also activated. At 610, the digital VAD 516 receives a digital audio stream (which may be converted by the ADC 520 before being received by the digital VAD 516).

At 612, the digital VAD 516 detects whether the digital audio stream includes a speech signal. If the digital audio stream is detected to include a speech signal, the digital VAD 516 provides a second indication 518 in response to detecting that the digital audio stream includes the speech signal (614). At 616, the low-power trigger 504 activates in response to the second indication 518 being provided. Similar to the first indication 514, the second indication 518 may act as a wake-up signal to the low-power trigger 504, which may remain in a low power mode until a speech signal is detected in a digital audio stream. In this manner, the indication 518 may trigger the low-power trigger 504 to activate from a low power mode to an active mode.

At 618, the low-power trigger 504 receives a digital audio stream (which may be the same or different than the digital audio stream received by the digital VAD 516). At 620, the low-power trigger 504 detects whether the digital audio stream includes one or more spoken keywords. If one or more spoken keywords are detected in the digital audio stream, the low-power trigger 504 provides a third indication 506 in response to detecting that the digital audio stream includes one or more spoken keywords (622). Similar to the first indication 514 and the second indication 518, the third indication 506 may act as a wake-up signal for the high-power subsystem 508. In this manner, the high-power subsystem 508 may remain in a low power mode until the low-power trigger 504 detects one or more keywords in a digital audio stream.

At 624, the high-power subsystem activates in response to the third indication 506 being provided. At 626, the high-power subsystem 508 receives one or more digital audio streams (such as the N digital audio streams generated by the ADC 520. In some implementations, the high-power subsystem 508 may also receive a reference signal 522 to be used in processing the digital audio streams. As used herein, a reference signal 522 refers to audio output by one or more loudspeakers included in or coupled to the audio processing device including the cascade audio spotting system 500. For example, the reference signal 522 may include audio played by the loudspeakers 210*a* and 210*b* and sensed by one or more of the microphones 205*a*-205*n*. The cascade KWS 223 (such as a high-power subsystem) may be configured to detect whether the one or more keywords are identified in a reference signal (instead of in other audio in the environment) in order to prevent the detection of one or more keywords being based on the reference signal (which may be considered an FA). Operation of the high-power subsystem 508 using the reference signal 522 is described in more detail below.

Figure 7:
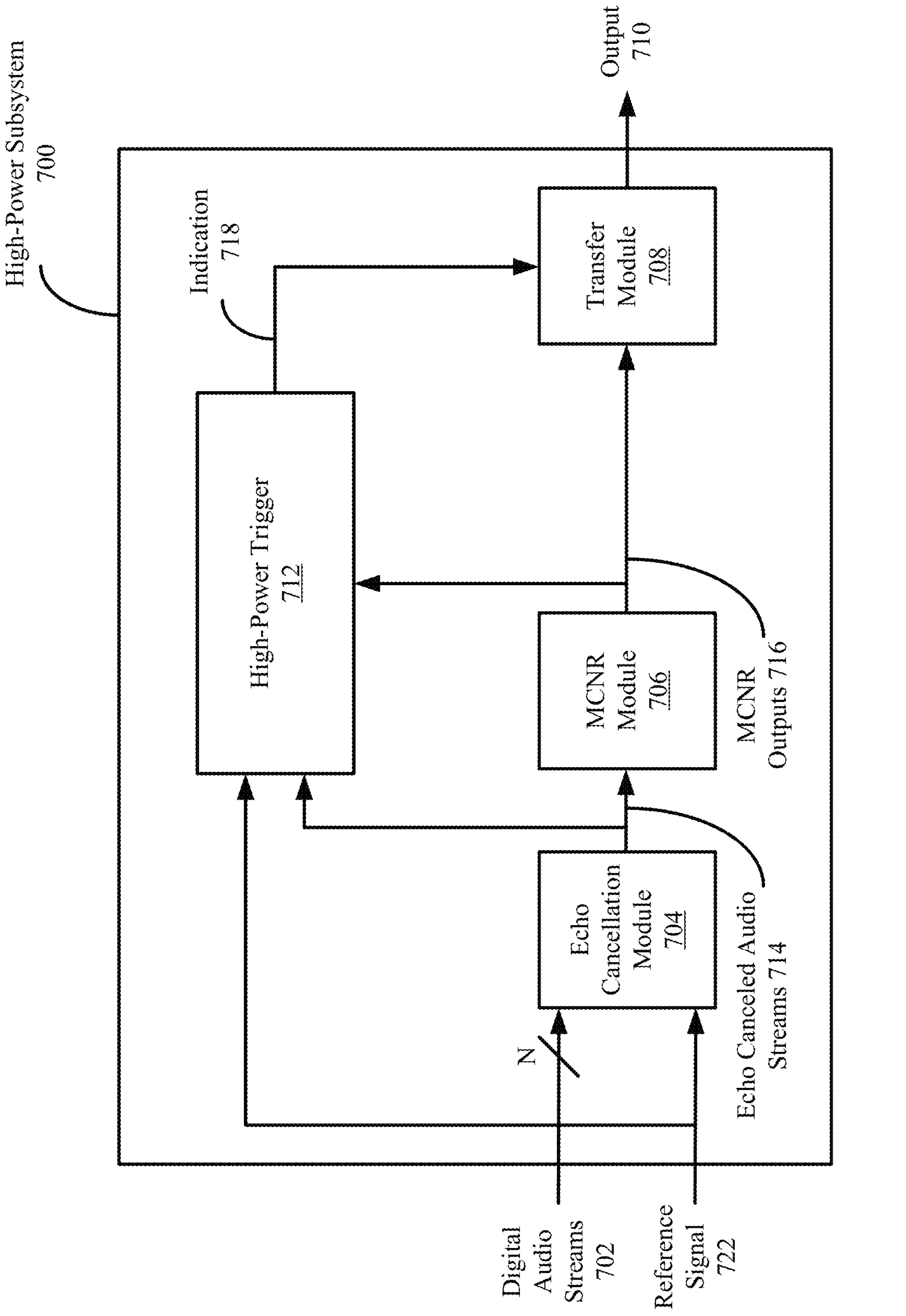
FIG. 7 illustrates a block diagram of an example high-power subsystem.

Referring back to FIG. 6, the high-power subsystem 508 detects if one or more digital audio streams include one or more spoken keywords. In some implementations, the one or more digital audio streams may be processed using various means before detecting one or more spoken keywords. For example, the high-power subsystem may perform echo cancellation (including cancellation of echoes of the reference signal from the audio streams) or may process the audio streams based on directionality of the audio source in the audio streams before detecting whether the one or more audio streams include one or more spoken keywords. An example implementation and operation of a high-power subsystem is depicted in FIG. 7 and described in more detail below.

The modules 512, 516, and 504 are depicted as receiving one audio stream. The processing of one audio stream instead of multiple audio streams may reduce the processing and power resources required to perform detection by the one or more modules. However, the one or more of the modules 512, 516, or 504 may be configured to receive and process two or more audio streams. While not shown, the modules 512, 516, 504, and 508 may be configured to process the same portions of audio streams (such as being synchronized to process audio streams associated with a same moment or window in time. For example, one or more buffers or other synchronization logic may be included in the cascade audio spotting system 500 to receive and store one or more audio streams. While the analog VAD 512 may process the analog audio stream in near real time, the synchronization logic may cause a small delay in the digital audio stream to the digital VAD 516 to ensure that the digital VAD 516 processes the temporal portion of the digital audio stream associated with the temporal portion of the analog audio stream detected to include a dynamic audio signal. The synchronization logic may also cause a slightly larger delay in the digital audio stream to the low-power trigger 504 to ensure that the low-power trigger 504 processes the temporal portion of the digital audio stream associated with the temporal portion of the digital audio stream detected by the digital VAD 516 to include a speech signal. The synchronization logic may also cause a slightly larger delay of the one or more audio streams to the high-power subsystem 508 than to the low-power trigger 504 to ensure that the high-power subsystem 508 process the temporal portions of the one or more audio streams associated with the temporal portion of the digital audio streams detected by the low-power trigger 504 to include one or more spoken keywords.

The modules of the cascade audio spotting system may be ordered from least power consumption to greatest power consumption when active over the same amount of time. In this manner, when the modules 512, 516, 504, and 508 are active, the analog VAD 512 may consume less power than the digital VAD 516, which may consume less power than the low-power trigger 504, which may consume less power than the high-power subsystem 508. Through cascading the modules, the cascade audio spotting system 500 reduces power consumption by activating the modules on an as needed basis. In addition, through using multiple modules, FRR can be increased while also decreasing the number of FAs.

The output 510 may be any suitable output, such as described above with reference to output 310. For example, the output 510 may include an indication that one or more keywords are detected (such as a binary signal being switched, a bit flag being set, or another suitable indication). In some implementations, the output 510 may include a processed audio stream or multiple processed audio streams detected to include one or more keywords for further processing to detect one or more voice commands. Operation of the high-power subsystem 508 to generate the output 510 based on the one or more audio streams 502 in digital form, the reference signal 522, and the third indication 506 is described in more detail below with reference to FIG. 7.

FIG. 7 illustrates a block diagram of an example high-power subsystem 700. The high-power subsystem 700 may be an example implementation of the high-power subsystem 308 in FIG. 3 or the high-power subsystem 508 in FIG. 5. The high-power subsystem 508 may be configured to perform one or more of echo cancellation, multi-channel noise reduction (MCNR), or other filtering operations. The high-power subsystem 508 may also be configured to identify a second target sound activity in one or more digital audio streams 702. In some implementations, the second target sound activity may be one or more spoken keywords. If a cascade audio spotting system includes a low-power trigger to detect one or more spoken keywords and the low-power trigger is cascaded with the high-power subsystem 700, the one or more spoken keywords to be detected may be the same for the low-power trigger and the high-power subsystem 508.

The high-power subsystem 700 includes an echo cancellation module 704, an MCNR module 706, a transfer module 708, and a high-power trigger 712. The depiction of the high-power subsystem 700 is simplified for clarity. For example, the high-power subsystem 700 may include one or more buffers or additional filters not depicted in FIG. 7. While a configuration of a high-power subsystem is depicted for example purposes, a high-power subsystem may include a different configuration of components or more or less components than as depicted in FIG. 7. As such, the present disclosure is not limited to the specific configuration of the high-power subsystem 700 in FIG. 7.

The echo cancellation module 704 receives N digital audio streams 702 (with integer N greater than or equal to 1) and the reference signal 722. Using the one or more digital audio streams 702 and the reference signal 722, the echo cancellation module 704 may be configured to perform acoustic echo cancellation (AEC). Referring back to FIG. 1, some audio may travel directly (in a line of sight (LOS) manner) from a source to the microphones 115*a*-115*d* of the device 105 (such as depicted as dashed lines directly from the speaker 110 to the device 105), and some audio may travel indirectly (in a non-line of sight (NLOS) manner) from a source to the microphones 115*a*-115*d* of the device 105 (such as depicted as dashed lines from the speaker 110 and bouncing off the walls 150*a* and 150*b* towards the device 105). Indirect audio may be referred to as echoes. AEC performed by the echo cancellation module 704 may include reducing or cancelling one or more echoes from the one or more digital audio streams 702.

The reference signal 722 may be included as an echo in the one or more digital audio streams 702 as captured by one or more microphones. The loudspeakers 120*a*-120*b* may play audio, which may bounce off of one or more surfaces and return to the device 105 to be sensed by the microphones 115*a*-115*d*. If the device 105 includes a cascade audio spotting system including the high-power subsystem 700, the reference signal 722 may be the audio played by the loudspeakers 120*a*-120*b*. If the audio played by the loudspeakers that is reflected back to the device 105 is sensed by the microphones 115*a*-115*d*, the one or more digital audio streams 702 includes reflections of the audio from the loudspeakers 120*a*-120*b*. The high-power subsystem 700 (such as the echo cancellation module 704) may receive the reference signal 722 associated with the one or more audio streams 702. Processing the one or more audio streams 702 by the high-power subsystem 700 in step 412 of FIG. 4 may include performing echo cancellation on the one or more audio streams 702 based on the reference signal 722 to generate one or more echo canceled audio streams 714. Referring to FIG. 2, the audio signal processor 220 (such as the DSP 224) may provide the audio signal to be played by the loudspeakers 210*a*-210*b* to the cascade KWS 223 as the reference signal 722. AEC by the echo cancellation module 704 may include identifying the reference signal 722 in the one or more digital audio streams 702 and cancelling the reference signal 722 from the one or more digital audio streams 702 to generate the one or more echo canceled audio streams 714.

The MCNR module 706 may be configured to perform MCNR on the one or more echo canceled audio streams 714 to generate one or more MCNR outputs 716. As noted above, the audio streams as recorded by one or more microphones may include noise. For example, a radio or television and other objects in an environment may output sound that is noise to a device attempting to detect one or more keywords spoken by a person in the environment. While the echo cancellation module 704 attempts to remove echoes from the one or more audio streams, the one or more echo canceled audio streams 714 may still include noise (such as from a television, a radio, or another device in the environment). The goal of MCNR may be to reduce noise while preserving speech in the one or more echo canceled audio streams 714. Processing the streams 714 using an MCNR operation may be based on multi-channel processing using a generalized eigenvalue beamformer. To note, each echo canceled audio stream may be a channel of a multi-channel signal processed using the generalized eigenvalue beamformer. Example implementations of a generalized eigenvalue beamformer suitable for use in the MCNR module 706 are described in Frederic Philippe Denis Mustiere, Francesco Nesta, "Voice enhancement in audio signals through modified generalized eigenvalue beamformer," U.S. Pat. No. 10,679,617, which is incorporated by reference in its entirety as if fully set forth herein.

While the MCNR module 706 may be configured to reduce noise and preserve speech in the streams 714, it is possible that one or more streams include speech-like noise. For example, a TV loudspeaker or a radio may play a news broadcast or other speech that is considered noise for the audio processing device that is to detect one or more spoken keywords from one or more live speakers in the environment. As a result, an audio stream may have a jumble of speech and speech like noise from various sources in the environment reaching a microphone concurrently. To improve a speech signal in an audio stream, the MCNR module 706 may be configured to identify one or more sources of sound activity (such as speech) in an environment of the audio processing device. Each source associated with a portion of sound activity may be in a direction from the audio processing device. The echo canceled audio streams may be processed to generate a MCNR output for each source based on the direction of the source. For example, multiple audio streams may be aggregated or otherwise combined, with the delays based on the direction of the source of the sound activity taken into account, to amplify speech in a resulting signal.

For example, referring back to FIG. 1, the microphones 115*a*-115*d* are spatially separated such that a sound event reaches each of the microphones at different times. A same sound event may be identified in each of the audio streams, and the delays in receiving the same sound event may be determined and compared in order to estimate a direction of the sound event with reference to the cascade audio spotting system (such as with reference to the device including the cascade audio spotting system). Estimating a direction of a sound activity may be performed repeatedly to track a direction of an audio source (such as a person talking and walking through the environment). In addition, audio streams may be delayed and combined based on the identified delays to enhance a target audio. As such, MCNR outputs 716 may be based on the most recent estimations of the directions of sound activities. The MCNR module 706 may be configured to identify or track any suitable number of sources/directions of sound activity (such as 2, 4, 8, and so on). In performing MCNR, the processed streams based on the direction of a sound activity may be processed similar to as discussed above regarding multi-channel processing using an eigenvalue beamformer (with each processed stream associated with a direction from the cascade audio spotting system being a channel of the multi-channel signal). In some implementations, the number of MCNR outputs 716 is based on the number of sources/directions estimated. For example, performing MCNR on the one or more echo canceled audio streams may include: estimating a first direction of a first portion of sound activity (such as a first speech direction) with reference to the cascade audio processing system; generating a first MCNR output for the first portion of the sound activity based on the first direction; estimating a second direction of a second portion of sound activity (such as a second speech direction) with reference to the cascade audio spotting system; and generating a second MCNR output for the second portion of sound activity based on the second direction. While the example explicitly depicts two MCNR outputs being generated, any number of outputs may be generated (such as one MCNR output for one identified direction or three or more MCNR outputs for three or more identified directions).

Example implementations of multi-source tracking suitable for implementation in the MCNR module 706 are described in Alireza Masnadi-Shiraz, Francesco Nesta, "MULTIPLE-SOURCE TRACKING AND VOICE ACTIVITY DETECTIONS FOR PLANAR MICROPHONE ARRAYS," U.S. Pat. No. 11,064,294, which is incorporated by reference in its entirety as if fully set forth herein. Example implementations of multi-stream target speech detection also suitable for implementation in the MCNR module 706 are described in Francesco Nesta and Saeed Mosayyebpour "MULTI-STREAM TARGET-SPEECH DETECTION AND CHANNEL FUSION," U.S. Patent Publication No. 2020/0184985, which is incorporated by reference in its entirety as if fully set forth herein.

The transfer module 708 is configured to provide the output 710 to one or more components of a device including the cascade audio spotting system. For example, the output 710 may be provided to a DSP 224, one or more host system components 250, or other portions of an audio processing device 200. The transfer module 708 may receive the one or more MCNR outputs 716, and the output 710 may include at least one of the one or more MCNR outputs 716. In some implementations, if MCNR is not to be performed, the one or more MCNR outputs 716 may be the one or more echo canceled audio streams 714. In this manner, the output 710 may include at least one of the one or more echo canceled audio streams 714. Which streams are included in the output 710 is based on an indication 718 from the high-power trigger 712. The transfer module 708 may include switching means, one or more buffers, and other components to synchronize the timing of the output 710 being provided, to ensure fast transfer of the output 710 to a destination, and to filter which streams (such as which of streams 714 or outputs 716) are to be included in the output 710. In some implementations, the indication 718 includes an indication as to whether a second target sound activity (such as one or more keywords) is detected in the one or more digital audio streams 702. For example, the indication 718 may include a binary signal or a binary flag to indicate whether the one or more audio streams 702 include the second target sound activity. In some implementations, the indication 718 may be used as a wake-up signal for the transfer module 708. In this manner, the transfer module 708 may be in a low power mode and not provide an output 710 until the indication 718 is received. In response to receiving the indication 718, the transfer module may activate from a low power mode to an active mode in order to provide the output 710. The indication 718 may also indicate which streams or MCNR outputs include the second target sound activity. The output 710 may thus be configured to include only MCNR outputs 716 or echo canceled audio streams 714 indicated as including the second target sound activity (such as including one or more spoken keywords). If neither AEC nor MCNR is to be performed, the digital audio streams 702 may be provided to the transfer module 708. In this manner, the indication 718 may indicate which of the digital audio streams 702 include the second target sound activity, and the output 710 may include the identified audio streams including the second target sound activity.

The high-power trigger 712 is configured to detect a second target sound activity in the one or more digital audio streams 702. The trigger 712 being "high-power" refers to the high-power trigger 712 having a high power consumption than a low-power trigger (or other modules) preceding the high-power subsystem in the cascade audio spotting system. For example, the high-power trigger 712 may use more processing resources or access a larger portion of memory to consume more power than operation of a low-power trigger. In some implementations, the high-power trigger 712 may include one or more processors to execute instructions, one or more special purpose or integrated circuits, software stored in memory and executed by one or more processors, or a combination of hardware and software to detect a target sound activity in one or more digital audio streams 702. In the examples below, the term "high-power trigger" may refer to the hardware performing the operations of the high-power trigger 712. Detecting whether the second target sound activity is in the one or more digital audio streams 702 may include one or more of detecting the second target sound activity in the reference signal 722, detecting the second target sound activity in one or more echo canceled audio streams 714, or detecting the second target sound activity in one or more MCNR outputs 716. To attempt to detect the second target sound activity in the various streams and signals, the high-power trigger 712 receives one or more of the reference signal 722, the one or more echo canceled audio streams 714, or the one or more MCNR outputs. In some implementations of receiving the plurality of echo canceled audio streams 714, the echo cancellation module 704 may combine the streams 714 to generate a single combined output, and the single combined output is provided to the high-power trigger 712. For example, the plurality of echo canceled audio streams are combined using a delay and sum beamformer to generate a time-based multiplexed output including the plurality of echo canceled audio streams 714. In some implementations of receiving the MCNR outputs 716, all MCNR outputs 716 may be provided by the MCNR module 706 to the high-power trigger 712. As noted above, one or more MCNR outputs may be based on a direction of sound activity included in the specific MCNR output.

Regarding processing the reference signal 722 by the high-power trigger 712, if the second target sound activity in detected in the reference signal 722, the second target sound activity is not detected in the one or more digital audio streams 702. For example, referring to step 412 in FIG. 4, processing the one or more audio streams by the high-power subsystem may include: detecting (by the high-power trigger 712) whether the second target sound activity (such as one or more spoken keywords) is included in the reference signal 722; and preventing detecting the second target sound activity in the one or more audio streams 702 in response to detecting the second target sound activity in the reference signal 722. In some implementations, if the second target sound activity is detected in the reference signal 722, the high-power trigger 712 may provide the indication 718 to indicate to the transfer module 708 that none of the MCNR outputs 716 (or any other input to the transfer module) is to be provided in the output 710. In addition, the high-power trigger 712 may not attempt to detect the second target sound activity in any echo canceled audio streams 714 or any MCNR outputs 716 received by the high-power trigger 712. If the second target sound activity is not detected in the reference signal 722, the high-power trigger 712 may proceed with attempting to detect the second target sound activity in the one or more echo canceled audio streams 714 and/or the one or more MCNR outputs 716. If the high-power trigger 712 detects the second target sound activity in one or more echo canceled audio streams 714 or one or more MCNR outputs 716, the indication 718 may indicate the specific streams 714 or outputs 716 including the second target sound activity. The transfer module 708 may use the indication 718 to provide the specific streams 714 or outputs 716 including the second target sound activity.

Figure 8:
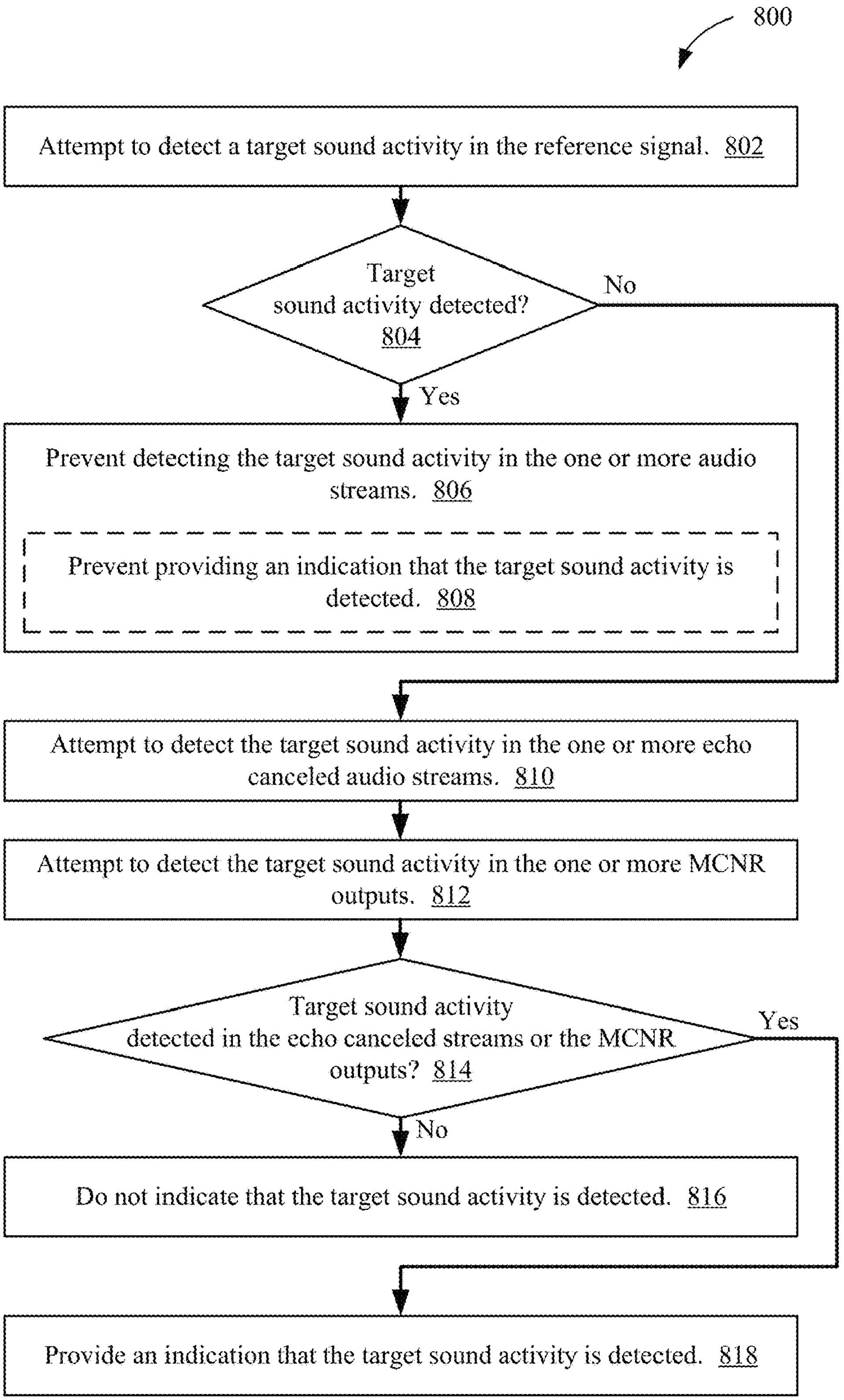
FIG. 8 illustrates a flow chart depicting an example operation of a high-power trigger.

FIG. 8 illustrates a flow chart depicting an example operation 800 of a high-power trigger. Operation 800 is described below with reference to the high-power trigger 712 in FIG. 7. At 802, the high-power trigger 712 attempts to detect a target sound activity (such as one or more spoken keywords) in the reference signal 722. Conceptually, if the target sound activity is one or more spoken keywords, the target sound activity in a reference signal means that the audio played by the loudspeakers of the audio processing device includes one or more spoken keywords. If detection of the spoken keywords from the reference signal would be considered a valid detection, a feedback loop of the device's output unintentionally controlling itself would be caused. As such, the times of the received audio streams 702 when the reference signal 722 includes one or more keywords may be excluded from being processed to ensure that the reference signal does not cause an FA. In this manner, if the target sound activity is detected in the reference signal (804), the high-power trigger 712 prevents detecting the target sound activity in the one or more audio streams (806). For example, the high-power trigger 712 may not attempt to detect the target sound activity in the echo canceled audio streams 714 or the MCNR outputs 716. In some implementations, the high-power trigger prevents providing an indication that the target sound activity is detected (808). For example, the indication 718 may include a low value of a binary signal or a bit flag set to a low value to indicate that the target sound activity is not detected.

If the target sound activity is not detected in the reference signal 722, the high-power trigger 712 attempts to detect the target sound activity in the one or more echo canceled audio streams 714 (810). For example, the high-power trigger 712 attempts to detect the target sound activity in a time-based multiplexed output including the plurality of echo canceled audio streams 714. At 812, the high-power trigger 712 also attempts to detect the target sound activity in the one or more MCNR outputs 716. If the target sound activity is not detected in any of the echo canceled streams 714 or any of the MCNR outputs 716 (814), the high-power trigger 712 does not indicate that the target sound activity is detected (816). For example, the indication 718 may include a low value of a binary signal or a bit flag set to a low value to indicate that the target sound activity is not detected. In some implementations, the transfer module 708 may remain in a low power mode or otherwise be configured to not provide a processed audio stream (such as an MCNR output 716, an echo canceled audio stream 714, or a digital audio stream 702) for further processing (such as to attempt to detect one or more voice commands). If the target sound activity is detected in at least one of the echo canceled streams 714 or at least one of the MCNR outputs 716 (814), the high-power trigger provides an indication that the target sound activity is detected (818). For example, the indication 718 may indicate which stream 714 or output 716 includes the target sound activity. In addition or to the alternative, the indication 718 may include a high value of a binary signal or a bit flag set to a high value to indicate that the target sound activity is detected. In some implementations, the transfer module 708 may activate from a low power mode to an active mode or otherwise be configured to provide one or more processed audio streams (such as an MCNR output 716, an echo canceled audio stream 714, or a digital audio stream 702) including the second target activity (such as one or more keywords) for further processing (such as to attempt to detect one or more voice commands succeeding a keyword in the audio stream).

A same logic of the high-power trigger 712 may be used to detect a target sound activity in each of step 802 for the reference signal 722, step 810 for the echo canceled audio streams 714, and step 812 for the MCNR outputs 716. As depicted by decision block 804, detecting whether a reference signal 722 includes a target sound activity is a gatekeeper event to steps 810-818. Decision block 814 (regarding detecting whether the echo canceled streams 714 or the MCNR outputs 716 include the target sound activity) is also a gatekeeper event to step 818. However, in comparing decision block 804 with decision block 814, the outputs of the decision blocks are reversed with reference to each other. To compensate for using the same logic for outputting a decision as to whether the target sound activity is detected for various different streams and outputs and the outputs of the decision blocks 804 and 814 being reversed with reference to each other, the output of the logic in detecting the target sound activity in the reference signal 722 may be fed to a NOT logic of the high-power trigger. For example, if the output of the decision logic is high indicating that the reference signal includes the target sound activity, the output is provided to the NOT logic, which outputs a low signal. The signal from the NOT logic may be used as an initiator to process the streams 714 or the outputs 716. For example, while not shown in FIG. 7, the signal from the NOT logic may be provided to the module 704 and the module 706. If the signal is low (indicating that the reference signal is detected to include the target sound activity), the modules 704 and 706 may be prevented from performing AEC and MCNR, respectively. For example, the modules 704 and 706 may be kept in a low power mode until the signal from the NOT logic is high. In some other implementations, the signal may prevent the high-power trigger 712 from receiving the streams 714 or the outputs 716, or the signal may prevent the high-power trigger 712 from using the detection logic to detect the target sound activity in the streams 714 or the outputs 716.

If the signal is high (indicating that the reference signal does not include the target sound activity), the modules 704 and 706 may be active to perform AEC and MCNR, respectively, and the detection logic of the high-power trigger 712 may be used to attempt to detect the target sound activity in any of the streams 714 or the outputs 716. For example, referring back to step 412 in FIG. 4, processing the one or more audio streams by the high-power subsystem may include: performing echo cancellation (such as by the echo cancellation module 704) on the one or more audio streams based on a reference signal to generate one or more echo canceled audio streams; and detecting (such as by the high-power trigger 712) whether the second target sound activity is included in the one or more echo canceled audio streams. In addition or to the alternative, processing the one or more audio streams by the high-power subsystem may include: performing MCNR (such as by the MCNR module 706) on the one or more echo canceled audio streams to generate one or more MCNR outputs; and detecting (such as by the high-power trigger 712) whether the second target sound activity is included in the one or more MCNR outputs.

As noted above, which MCNR output 716 is provided by the transfer module 708 in the output 710 may be based on the indication 718 from the high-power trigger as to which MCNR output is detected as including the target sound activity. For example, referring back to the example of the MCNR module 706 generating a first MCNR output based on a first direction of sound activity and generating a second MCNR output based on a second direction of sound activity, which MCNR output is to be provided by the transfer module 708 is based on which MCNR output includes the target sound activity (such as one or more spoken keywords). In some implementations of the operation 400 in FIG. 4, detecting the second target sound activity in the one or more audio streams includes the high-power trigger 712 detecting the second target sound activity in at least one of the first MCNR output or the second MCNR output. The high-power trigger 712 may detect whether the second target sound activity is included in one of the first MCNR output or the second MCNR output (such as is the second target sound activity in the first MCNR output or the second MCNR output). In response to detecting that the second target sound activity is included in one of the first MCNR output or the second MCNR output, the high-power subsystem 700 (such as the transfer module 708) provides the MCNR output including the second target sound activity (which is used to identify one or more commands for operations to be performed). As noted above, the output of the transfer module 708 is based on the indication 718, which indicates which MCNR output includes the second target sound activity. Identifying one or more commands for operations to be performed may include identifying one or more voice commands after one or more spoken keywords in the MCNR output. A voice command is associated with one or more device operations (such as adjusting a loudspeaker volume, starting or stopping playback of media, and so on). After the audio processing device identifies a voice command, the audio processing device may initiate the execution of the operations associated with the voice command.

Regarding the detection logic of the high-power trigger 712, the high-power trigger 712 may include one or more detection models to detect the second target sound activity. As noted above with reference to the digital VAD and the low-power trigger, a detection model may include any suitable model, such as an ML model, a statistical model, and so on, configured to detect a target sound activity in a digital audio stream. For example, the high-power trigger 712 may include a large ML model (such as a large neural network) trained to detect the second target sound activity (such as one or more spoken keywords). In a specific example, if the available memory of the audio processing device is 100 KB and the low-power trigger includes one or more detection models implemented in software and stored in less than 30 KB of the 100 KB, a large detection model of the high-power trigger may be implemented in software and stored in the remaining 70 KB of the available 100 KB. The larger detection model may be associated with a lower number of FAs and a low FRR in detecting a target sound activity as compared to a preceding low-power trigger using one or more smaller detection models to detecting the target sound activity (such as one or more spoken keywords).

In some other implementations, the high-power trigger 712 may include one or more smaller detection models instead of a large detection model. The one or more smaller detection models may be implemented in software and stored in the available memory. Across a low-power trigger and a high-power trigger being used to detect a target sound activity, a collection of one or more smaller detection models may be used to determine the probability of one or more audio streams including the target sound activity. In some implementations, the low-power trigger includes a first set of one or more detection models associated with a first set of one or more hyperparameters (such as one or more detection thresholds). The high-power trigger includes a second set of one or more detection models associated with a second set of one or more hyperparameters (such as one or more detection thresholds).

As noted above, an audio processing device may have limited available memory to implement the cascade audio spotting system. In some implementations, the first set of one or more detection models (associated with the low power trigger) and the second set of one or more detection models (associated with the high power trigger) may be stored in a shared memory. In this manner, the low-power trigger and the high-power trigger may access the same memory for one or more detection models to detect a target sound activity.

In some implementations of increasing the effectiveness of the cascade audio spotting system while ensuring the detection models meet the limited memory constraints, one or more detections models used for the low-power trigger may be reused for the high-power trigger. In this manner, additional or more complex models may also be used for the high-power trigger since duplicate instances of the same detection models for the low-power trigger do not need to be stored for the high-power trigger. For example, the low-power trigger may include four detection models with thresholds (and other hyperparameters) associated with a very low FRR but a higher number of FAs. The hyperparameters associated with the low-power trigger may be stored in the memory and used by the low-power trigger to configure the four detection models for use by the low-power trigger. The high-power trigger may include 12 detection models, which include the four detection models used by the low-power trigger and eight other detection models. The same four detection models to be used by the high-power trigger may be associated with different hyperparameters (such as different detection thresholds) than the hyperparameters associated with the low power trigger. For example, a trained ML model as used by the low-power trigger may be associated with a detection threshold DT1, and the trained ML model as used by the high-power trigger may be associated with a detection threshold DT2 (with DT2 greater than DT1). DT1 is low to reduce the FRR but cause a large number of FAs. DT2 is higher to reduce the large number of FAs. In a simplified example, DT1 may be 0.1 to reduce the FRR for the detection model, and DT2 may be 0.9 to reduce the number of FAs. To configure a detection model for the appropriate trigger, the trigger executing the detection model loads from memory the appropriate hyperparameters associated with the trigger for the detection model and configures the detection model using the loaded hyperparameters. For example, the DT1 or DT2 may be loaded from memory and used based on which trigger is using the detection model. In this manner, reused detection models may be configured as needed for the different triggers.

As noted above, in some implementations, the low-power trigger may be configured to detect one or more spoken keywords (or another suitable audio event) based on any of the first set of detection models detecting the one or more spoken keywords (e.g., logically OR'ing the outputs of the detection models when used for the low-power trigger). Regarding the high-power trigger, in addition to using more detection models, the high-power trigger may use ensembling to generate an overall decision as to whether the high-power trigger detects one or more spoken keywords (or another suitable audio event). Ensembling is used to increase the accuracy of the high-power trigger's decisions as compared to the low-power trigger's decisions (as measured based on a lower number of FAs and a lower FRR).

As used herein, ensembling refers to counting the number of detection models that detect the target sound activity (such as one or more keywords) and comparing the number to an ensemble threshold (ET). For example, if the number of detection models used by the high-power trigger is 16, the ensemble threshold may be an integer from 1 to 16. Each detection model is configured by the high-power trigger based on the associated hyperparameters (such as detection threshold associated with the detection model and the high-power trigger), and each detection model is used to attempt to detect the target sound activity. The detection model may output a binary value indicating whether or not the detection model detects the target sound activity. If the ensemble threshold is 8, at least 8 detection models of the 16 detection models need to detect the target sound activity in order for the high-power trigger to detect the target sound activity. If less than 8 detection models detect the target sound activity, the high-power trigger does not detect the target sound activity. In some implementations, the ensemble threshold may be depicted as a value from 0 to 1. In this manner, the number r to be compared to the ensemble threshold may be a ratio of the number of detection models m that detect the target sound activity divided by the total number of detection models M. For example, if 8 of 16 detection models detect the target sound activity, r is 0.5 (8 divided by 16). If r is less than ET, the high-power trigger does not detect the target sound activity. If r is greater than or equal to ET, the high-power trigger detects the target sound activity. As noted herein, an ensemble threshold may be a hyperparameter associated with the high-power trigger.

Example implementations of a cascade audio spotting system are described above. Cascading multiple detection modules of increasing power requirements and increasing accuracy as described above so that only the detection modules needed at one time are active reduces power consumption of the cascade audio spotting system while ensuring a high level of accuracy. As noted, a cascade audio spotting system may be a KWS to detect a keyword to wake-up an audio processing device (such as "Hey Siri," "Alexa," or "OK Google"). The KWS may also provide a processed audio stream including the keyword for processing by the audio processing system. Once the audio processing system is active, the audio processing system may process the provided stream to detect one or more voice commands that follow the keyword in the audio stream. Also as noted, in some other implementations, the cascade audio spotting system may be configured to detect non-speech audio events. For example, an audio event of a dog barking, an alarm sounding, or other types of audio may be detected by the cascade audio spotting system, and the cascade audio spotting system may wake-up the audio processing device to perform one or more functions (such as sending an alert to a user via a text message or other communication means, displaying a camera feed of an environment including the source of the detected audio event, and so on). In some implementations, a cascade audio spotting system configured to detect a non-speech audio event may include a low-power trigger and a high-power subsystem arranged in a cascade manner without an analog VAD or a digital VAD.

As noted above, the low-power trigger and the high-power trigger may include one or more detection models. Each detection model is used to detect a target sound activity, and each detection model may include one or more hyperparameters that may be associated with the specific trigger using the detection model. For example, a detection model may be associated with a first detection threshold for use by the low-power trigger and may be associated with a second detection threshold for use by the high-power trigger (if the detection model is used by both triggers). As such, a first set of detection models to be used by the low-power trigger is associated with a first set of hyperparameters, and a second set of detection models to be user by the high-power trigger (which may include at least a portion of the first set of detection models) is associated with a second set of hyperparameters. Any of the hyperparameters from the first set and the second set of hyperparameters may be configured in any suitable manner, such as by a device manufacturer, a software developer, a tester, a user, or another entity as suitable. In some implementations (such as depicted in the examples described below), the audio processing device itself may be configured to automatically adjust one or more hyperparameters based on operation of the audio processing device or noise in the environment of the audio processing device. For example, one or more detection thresholds and an ensemble threshold (together referred to as "trigger thresholds") may be automatically adjusted by the cascade audio spotting system. Adjustment of the trigger thresholds may be based on various circumstances, such as whether the audio processing device is playing audio through the speakers of the audio processing device (which may cause more noise to exist in the audio streams), whether the number of spoken keywords that have been detected in a short amount of time is greater than a threshold (indicating that a user is currently interacting with the audio processing device), whether a threshold number of users are attempting to concurrently interact with the audio processing device, whether a user is closer or further away from the audio processing device while interacting with the audio processing device, or other factors that may affect operation of the audio processing device.

In some implementations, the cascade audio spotting system may be configured to operate in a regular mode and one or more sensitivity modes. Each mode is associated with a unique configuration of hyperparameter values for the one or more detection models of the high-power trigger. In some implementations, the unique configuration of hyperparameters values may also be for the one or more detection models of the low-power trigger. For example, a regular mode may be associated with a first set of DTs and a first ET, and a sensitivity mode may be associated with a second set of DTs and a second ET. Use of different hyperparameters for different scenarios may improve the performance of the cascade audio spotting system, such as described below. Configuration of the cascade audio spotting system to be in different modes and operation of the cascade audio spotting system for the different modes is described in more detail below. To note, a “first set of hyperparameters” associated with a regular mode as described below is different from and not to be confused with the “first set of hyperparameters” associated with a low-power trigger as described above, a “second set of hyperparameters” associated with a sensitivity mode as described below is different from and not to be confused with the “second set of hyperparameters” associated with a high-power trigger as described above.

The examples below are described with reference to a target sound activity to be detected by a cascade audio spotting system being one or more keywords to wake the audio processing system to identify and process one or more voice commands. In addition, the examples depict a cascade audio spotting system switching between a regular mode and one sensitivity mode. Also, the examples depict a cascade audio spotting system switching modes based on a number of keywords detected. Furthermore, the examples depict adjusting one or both of one or more detection thresholds or an ensemble threshold when switching between modes. However, it is to be understood that the examples described herein may be simplified from what is deployed in practice in order to provide clarity in explaining aspects of the present disclosure. For example, a cascade audio spotting system may be configured to detect non-speech audio events, may be configured to switch among a regular mode and a plurality of sensitivity modes, may be configured to switch modes based on criteria other than the number of keywords detected (such as whether one or more loudspeakers of the audio processing device are playing sounds), or may be configured to adjust one or more hyperparameters in addition or alternative to the trigger thresholds when switching between modes.

When a user interacts with an audio processing device for voice assistance (such as a smart speaker, a smart display, a smart television, a smartphone providing voice assistance, and so on), multiple instances of a keyword (such as “Hey Siri,” “Alexa,” or “OK Google”) followed by a voice command (such as “increase volume,” “what is . . . ?,” “change to channel 3,” and so on) may occur in a short amount of time. For example, a user may interact with an audio processing device to control a television with the following speech in sequence (and the ellipses indicating pauses in speech), “Alexa . . . Turn on TV . . . Alexa . . . Change Source to HDMI 1 . . . Alexa . . . Turn to channel 3 . . . Alexa . . . Increase Volume . . . Alexa . . . Begin Recording.” As shown, a keyword followed by a voice command occurs multiple times in a short amount of time. The audio processing device may go back to a low power mode after performing the operation associated with each voice command, and each successive keyword may cause the audio processing device to wake up from the low power mode.

While a regular mode may be associated with a low FRR, the hyperparameters used by the cascade audio spotting system may still cause FRs to occur. For example, a keyword may not be spotted while the user is interacting in quick succession with the audio processing device. FRs may also be more likely in noisy environments (such as when the television begins playing audio through the loudspeakers at a high volume) because the signal of interest with reference to the noise may be of a much lower intensity (such as an audio stream having a lower signal-to-noise ratio (SNR)). The user may be required to adjust his or her interaction with the audio processing device as a result of more FRs, which may negatively impact the user’s experience. For example, the user may need to slow down his or her speech, repeat a keyword multiple times, speak louder, or use longer pauses to prevent FRs from occurring. Forcing the user to adapt his or her interaction with the audio processing device may frustrate the user (who may even give up and attempt to manually control a device). To prevent requiring the user to repeat a keyword or otherwise adjust his or her interaction with the audio processing device for the cascade audio spotting system to detect one or more keywords, the cascade audio spotting system may switch to a sensitivity mode in some instances to reduce the FRR (such as towards zero percent). For example, as noted above, reducing the FRR may increase the chance of FAs. However, if the user is interacting with the audio processing device using multiple instances of a keyword and voice command in succession, an FA is less likely than when no interaction with the audio processing device is occurring. Since an FA is less likely to occur during frequent interaction with the audio processing system, the cascade audio spotting system may switch to operate in a sensitivity mode (such as by adjusting one or more hyperparameters being used by the high-power trigger for one or more detection models) to reduce the FRR.

Figure 9:
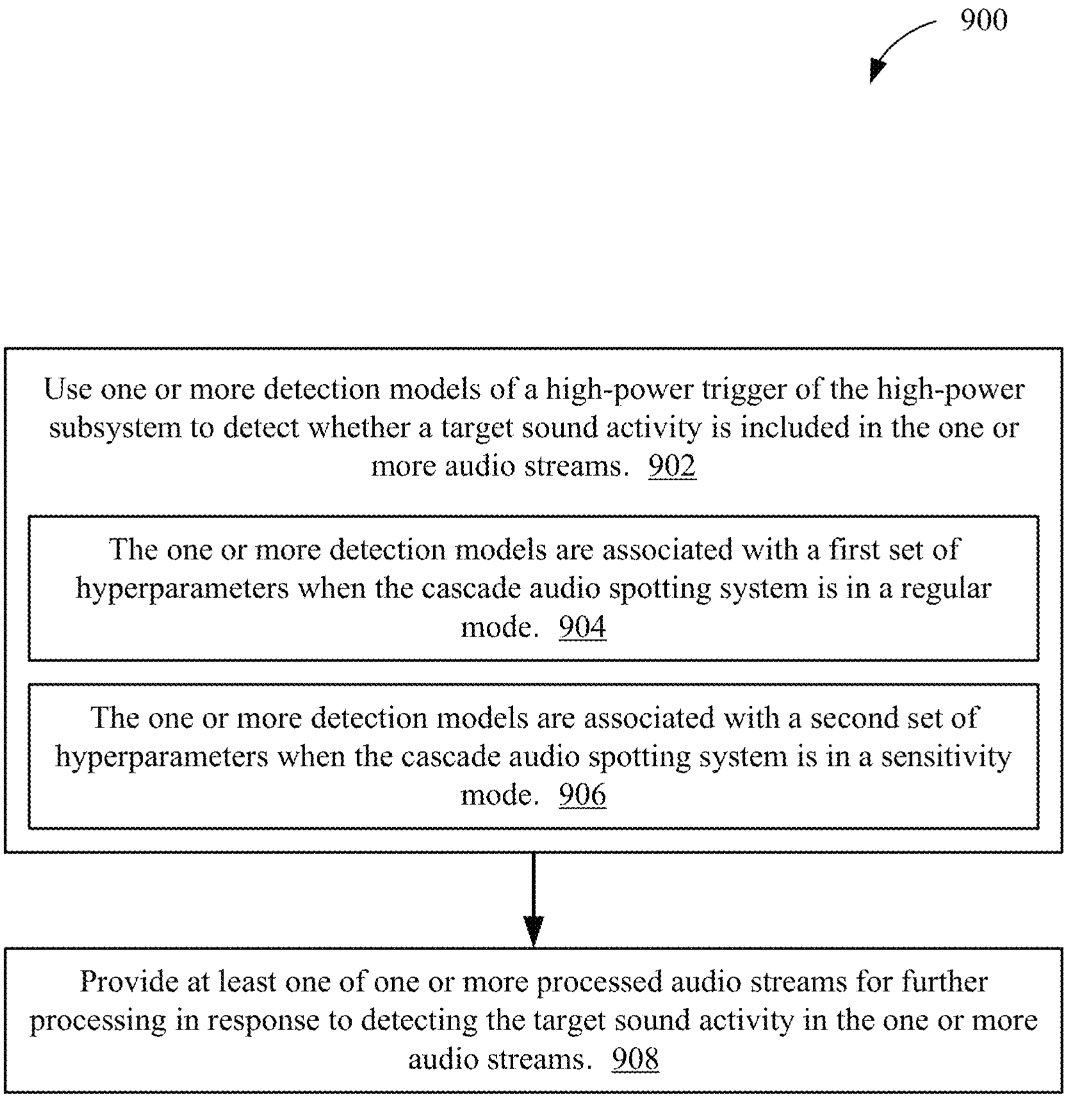
FIG. 9 illustrates a flow chart depicting an example operation of a high-power subsystem of a cascade audio spotting system capable of operating in a regular mode and one or more sensitivity modes.

FIG. 9 illustrates a flow chart depicting an example operation 900 of a high-power subsystem of a cascade audio spotting system capable of operating in a regular mode and one or more sensitivity modes. The operation 900 is described as being performed by the high-power subsystem 700 in FIG. 7, but any suitable high-power subsystem may be used. An example cascade audio spotting system including the high-power subsystem 700 performing operation 900 may include the cascade KWS 223 in FIG. 2, the cascade audio spotting system 300 in FIG. 3, the cascade audio spotting system 500 in FIG. 5, or another suitable cascade audio spotting system. A target sound activity to be detected by a high-power trigger 712 of the high-power subsystem 700 is depicted as being a keyword or one or more keywords to wake an audio processing device (such as the audio processing device 200 in FIG. 2), but any suitable target sound activity may be used.

At 902, the high-power trigger 712 uses one or more detection models to detect whether a target sound activity is included in the one or more audio streams 702. The one or more detection models are associated with a first set of hyperparameters when the cascade audio spotting system is in a regular mode (904), and the one or more detection models are associated with a second set of hyperparameters when the cascade audio spotting system is in a sensitivity mode (906). For example, a detection model may be associated with a first DT to be used when the cascade audio spotting system is in the regular mode, and the detection model may be associated with a second DT to be used when the cascade audio spotting system is in the regular mode. The different thresholds may be stored in memory and retrieved based on the operating mode of the cascade audio spotting system. A DT for a sensitivity mode may be referred to as a DST. In this manner, the detection model may be associated with a DT and a DST. In another example, if the high-power trigger 712 includes a plurality of detection models and uses ensembling to detect a target sound activity, the high-power trigger 712 may be associated with a first ET to be used when the cascade audio spotting system is in the regular mode, and the high-power trigger 712 may be associated with a second ET to be used when the cascade audio spotting system is in the regular mode. An ET for a sensitivity mode may be referred to as an EST. In this manner, the high-power trigger 712 may be associated with an ET and an EST. The high-power trigger 712 being associated with an ET and an EST may be in addition or alternative to one or more detection models being associated with a DT and a DST. Since a sensitivity mode is to reduce the FRR for the high-power trigger, a DT may be greater than a DST, and an ET may be greater than an EST.

While many of the examples describe the different sets of hyperparameters including different DTs or different ETs, as noted above, hyperparameters may include a variety of values to configure one or more detection models. For example, if a detection model is an ML model, hyperparameters may include constraints or values of the ML model in order to configure the ML model for use by the high-power trigger 712. For example, if the ML model is a trained neural network, the hyperparameters may include a relationship score between nodes of different layers of the neural network. The constraints or values of the ML model may differ based on if the cascade audio spotting system is in the active mode or the sensitivity mode. In some examples, an ML model may be trained in different ways, such as using a different dataset (such as with different labels for supervised training), using a different learning rate, using a different optimization algorithm, and so on, based on the different operating modes of the cascade audio spotting system. If the detection model is a statistical model, different statistical values (such as a different median, mean, standard deviation, and so on) may be used based on the operating modes of the cascade audio spotting system. As such, the different sets of hyperparameters may include different values for any suitable hyperparameter. The multiple sets of hyperparameters may be stored in memory, and the relevant set of hyperparameters may be retrieved based on the operating mode of the cascade audio spotting system.

At 908, the transfer module 708 provides at least one of one or more processed audio streams for further processing in response to detecting the target sound activity in the one or more audio streams. For example, as described above, the transfer module 708 may provide an MCNR output 716 including the target sound activity based on the MCNR output 716 being identified by the indication 718 from the high-power trigger 712.

While FIG. 9 and the examples below are with reference to a single sensitivity mode, the cascade audio spotting system may be configured to operate and switch among one or more sensitivity modes. For example, a first sensitivity mode may be for when the user is frequently interacting with the audio processing device but there is little background noise (such as based on a SNR of the intensity of the user's voice signal compared to the intensity of the total sound signal being less than an SNR threshold). A second sensitivity mode may be for when the user is frequently interacting with the audio processing device but there is a lot of background noise (such as based on the SNR being greater than the SNR threshold). In another specific example, multiple SNR thresholds may exist such that there are more than two sensitivity modes. In some implementations, the cascade audio spotting system is associated with different levels of sensitivity modes, and the system may be configured to move up or down in level of sensitivity mode (such as from a first level sensitivity mode to a second level sensitivity mode to a third level sensitivity mode and vice versa) based on whether the system is to switch modes (such as based on different SNR thresholds or other suitable triggers to cause switching operating modes).

The cascade audio spotting system switching between operating in a regular mode and a sensitivity mode may include the high-power trigger 712 switching between using the first set of hyperparameters and the second set of hyperparameters. For example, if the high-power trigger 712 includes a first detection model (such as one large model) associated with a DT and a DST, the cascade audio spotting system switching between the regular mode and the sensitivity mode may include the high-power trigger 712 switching between using the DT and the DST. If the high-power trigger includes additional detection models (such as a plurality of smaller models with the first detection model also being a smaller model) associated with a DT and a DST (such as DT1 and DST1 for a first detection model, DT2 and DST2 for a second detection model, and so on), one or more of the following may be performed by the high-power trigger 712: switching between a DT1 and a DST1 for the first detection model; switching between a DT and a DST for one or more of the additional detection models (which may include a subset or all of the detection models); or switching between an ET and an EST. In some implementations, a detection threshold may not change for some detection models based on the mode. For example, a detection model focusing on a noisy input may not be associated with different detection thresholds based on a frequency of interaction by the user. As such, some of the detection threshold being used may not be adjusted when switching operating modes.

While switching operating modes by the cascade audio spotting system is described in the examples as switching the set of hyperparameters to be used for a high-power trigger, as noted above, one or more hyperparameters may be associated with one or more detection models of a low-power trigger. In some implementations, one or more hyperparameters may also be associated with a detection model of a digital VAD. In some implementations, the cascade audio spotting system switching between operating in a regular mode and a sensitivity mode may include one or both of the low-power trigger switching between sets of different hyperparameters for its one or more detection models or the digital VAD switching between sets of different hyperparameters for its detection model. Other operations may also be performed between operating modes (such as disabling or enabling one or more detection modules based on the operating mode). For example, an analog VAD, a digital VAD, and a low-power trigger may be used in a regular mode, but one or more of the analog VAD, the digital VAD, or the low-power trigger may be bypassed in the sensitivity mode (such as when the user continues to frequently interact with the audio processing device).

In some implementations, switching from a regular mode to a sensitivity mode is based on a first number of keywords being spotted during a first amount of time (such as 3 keywords to wake the audio processing device being spoken within 30 seconds). In some implementations, switching from the regular mode to the sensitivity mode may also depend on if the high-power trigger would detect a target sound activity when in the sensitivity mode (such as when using a second set of hyperparameters) but not when in the regular mode (such as when using a first set of hyperparameters). Switching back to the regular mode may be based on a second number of keywords being spotted during a second amount of time (such as 1 keyword every 10 seconds). In this manner, the cascade audio spotting system may switch to a sensitivity mode when the user frequently interacts with the audio processing device, and the cascade audio spotting system may automatically revert back to a regular mode when the user stops interacting with the audio processing device. Example implementations of switching between a regular mode and a sensitivity mode are described below with reference to FIGS. 10-15.

Figure 10:
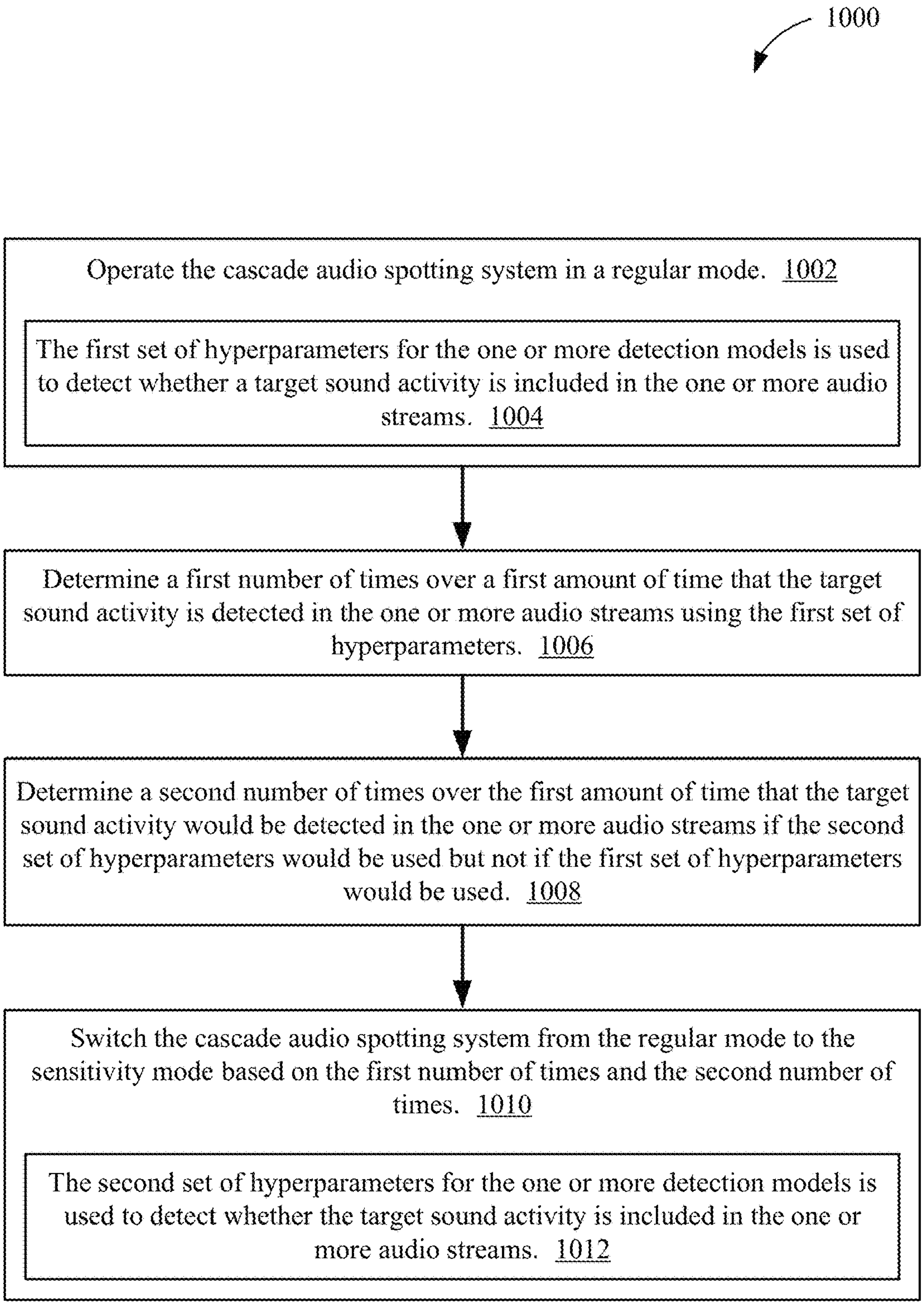
FIG. 10 illustrates a flow chart depicting an example operation of a cascade audio spotting system switching from a regular mode to a sensitivity mode.

FIG. 10 illustrates a flow chart depicting an example operation 1000 of a cascade audio spotting system switching from a regular mode to a sensitivity mode. FIG. 10 (and FIGS. 11-15) are described with reference to the high-power subsystem 700 in FIG. 7 or a cascade audio spotting system for clarity in explaining aspects of the present disclosure. However, any suitable cascade audio spotting system and high-power subsystem may be used to perform the operations described.

At 1002, the cascade audio spotting system operates in a regular mode. When the cascade audio spotting system operates in a regular mode, the high-power trigger 712 uses the first set of hyperparameters for its one or more detection models to detect whether a target sound activity is included in the one or more audio streams 702 (1004). For example, the one or more detection models are configured using the first set of hyperparameters, and the one or more processed audio streams provided to the high-power trigger 712 (such as the echo canceled audio streams 714, the MCNR outputs 716, or the reference signal 722) are input into the one or more detection models of the high-power trigger 712 to detect whether the target sound activity is included in the one or more processed audio streams (to indicate that the target sound activity is included in the digital audio streams 702).

At 1006, the high-power trigger 712 determines a first number of times over a first amount of time that the target sound activity is detected in the one or more audio streams using the first set of hyperparameters. For example, a counter or other suitable timer may be used to count to a defined amount of time during which high-power trigger 712 detects a target sound activity a number of times (such as 0, 1, 2, and so on). In a specific example, the high-power trigger 712 may use a 30 second counter to determine the number of times that the target sound activity is detected. The number of times that the target sound activity is detected may be used to generate an interaction score (IS), which is used to determine whether the cascade audio spotting system is to remain in the regular mode or is to switch to a sensitivity mode.

Sometimes, a target sound activity would be detected by the high-power trigger 712 if the second set of hyperparameters associated with the sensitivity mode is used, but the target sound activity is not detected by the high-power trigger 712 when using the first set of hyperparameters. For example, if a DST instead of a DT is used for a detection model, the high-power trigger 712 may detect a target sound activity. Additionally or alternatively, if an EST instead of an ET is used for ensembling by the high-power trigger 712, the high-power trigger 712 may detect a target sound activity.

At 1008, the high-power trigger 712 determines a second number of times over the first amount of time that the target sound activity would be detected in the one or more audio streams 702 if the second set of hyperparameters would be used but not if the first set of hyperparameters would be used. For example, the high-power trigger 712 may retrieve both the first set of hyperparameters (associated with the regular mode) and the second set of hyperparameters (associated with the sensitivity mode). In addition to the one or more detection models being configured using the first set of hyperparameters and being used to detect a target sound activity, the one or more detection models may be configured using the second set of hyperparameters and used to detect a target sound activity. In this manner, the one or more processed audio streams may be processed twice by the high-power trigger 712 (such as once with the detection models configured using the first set of hyperparameters and again with the detection models configured using the second set of hyperparameters). While only the detection of the target sound activity using the first set of hyperparameters impacts the indication 718 when operating in the regular mode (such as to wake the audio processing system to attempt to detect one or more voice commands), detection of the target sound activity using the second set of hyperparameters can be used in generating the IS to determine whether to switch the cascade audio spotting system to operate in the sensitivity mode. In this manner, detection using the first set of hyperparameters and detection using the second set of hyperparameters may impact generating an IS. The amount of time that is to be counted may be any suitable amount of time, which may be defined by the manufacturer, in software, by the user, or in any other suitable manner.

In some implementations, the first number and the second number are based on a spacing between instances that the target sound activity is detected being less than a threshold amount of time. For example, the IS is based on the number of times the target sound activity is detected using either sets of hyperparameters without the gap between successive detections being greater than a maximum threshold (such as a keyword being spoken more than 10 seconds apart). As such, the first amount of time (and the second amount of time) described herein may be associated with an amount of time during which successive detections of the target sound activity is not spaced more than a defined threshold amount of time apart.

In some implementations of detecting a target sound activity a first number of times and a second number times during a first amount of time using one detection model associated with a DT and a DST, the detection model may generate a probability p of whether the target sound activity is included in a processed audio stream. The high-power trigger 712 may compare p to DT and to DST. To note, a probability p may be generated and compared for each processed audio stream if the detection model is a single input model for one audio stream (which may also be used to identify which processed audio stream includes the target sound activity). If the detection model is a multiple input model (such as some ML models), a probability p may be generated for the multiple audio streams input into the detection model, which may be compared to the different detection thresholds.

Figure 11:
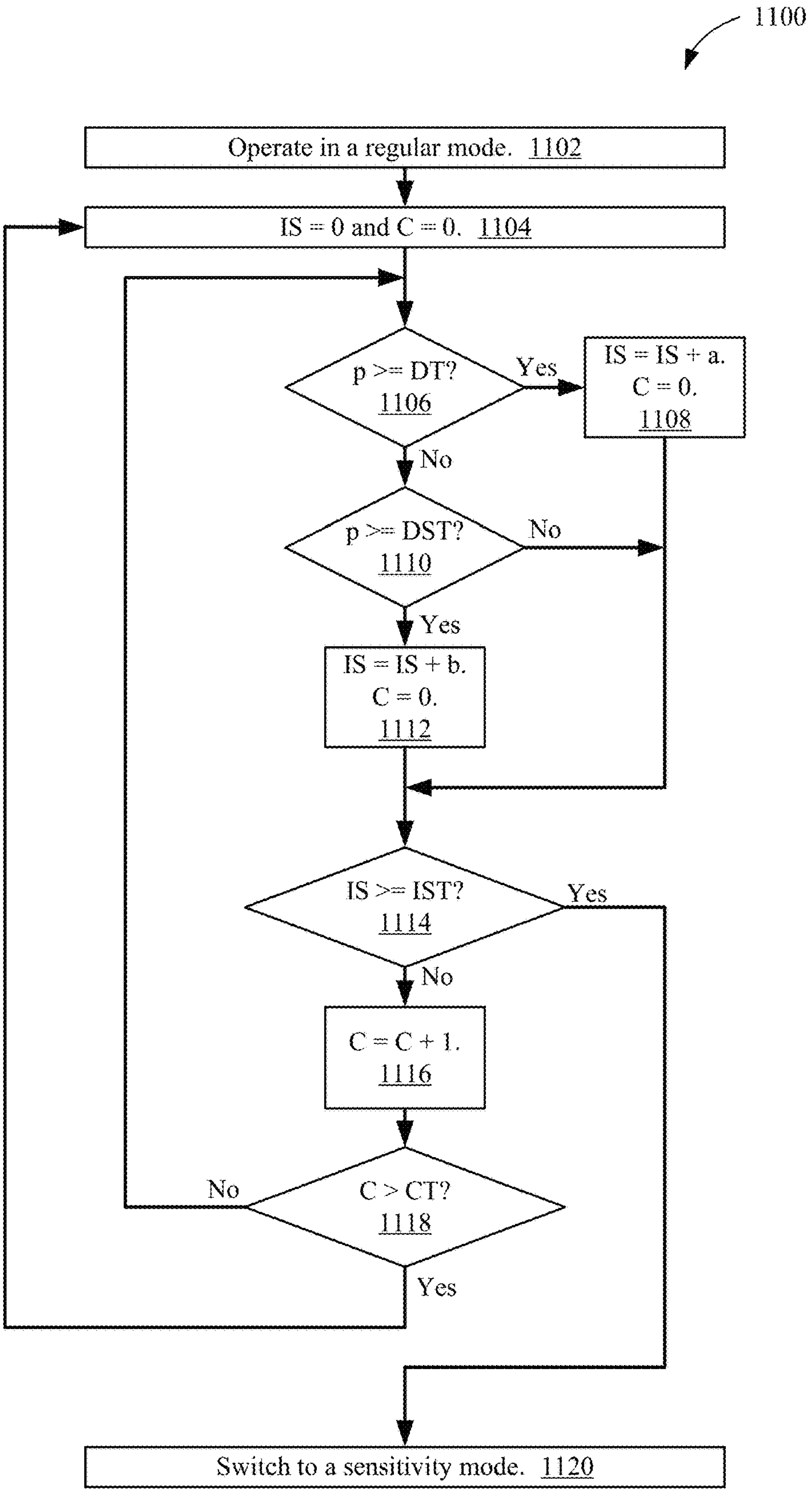
FIG. 11 illustrates a flow chart depicting an example implementation of the operation depicted in FIG. 10.

FIG. 11 illustrates a flow chart depicting an example implementation of the operation 1000. The operation 1100 is based on the high-power trigger 712 using one detection model associated with a DT and a DST to detect a target sound activity over a first amount of time. In some implementations, the detection model may be the sole detection model of the high-power trigger 712 (such as a large detection model as compared to the one or more detection models of a low-power trigger). In some other implementations, the detection model may be one of multiple detection models of the high-power trigger 712. For example, one detection model may be designated as a reference detection model to be configured multiple times using different sets of hyperparameters. In this manner, the high-power trigger may not be required to configure each and every detection model using multiple sets of hyperparameters, which may conserve power and processing resources.

At 1102, the cascade audio spotting system operates in a regular mode. In the regular mode, the high-power trigger 712 uses the first set of hyperparameters for a first detection model. The first set of hyperparameters includes a first detection threshold DT associated with the first detection model. To note, a second set of hyperparameters for the second detection model may be for when the cascade audio spotting system operates in a sensitivity mode. The second set of hyperparameters includes a second detection threshold DST associated with the first detection model.

As noted above, a first number of times that the target sound activity is detected using the first set of hyperparameters and a second number of times that the target sound activity is detected using the second set of hyperparameters (but not detected when using the first set of hyperparameters) during a first amount of time may be used in generating an IS. The IS may be used to decide whether the cascade audio spotting system is to switch to a sensitivity mode or is to remain in a regular mode. The first amount of time may be based on the amount of time between successive detections of the target sound activity.

At 1104, the memory indicating the IS and a timer is initialized (such as setting an IS value in the memory to 0 and a setting a counter C to 0). The counter C may be configured to measure the amount of time between successive detections of the target sound activity using either set of hyperparameters. The counter C may be configured to count known increments of time associated with temporal portions of an audio stream being processed by the first detection model. For example, a detection model may be conceptualized as a temporally sliding window across the audio stream to identify a target sound activity in the audio stream that exists within the sliding window at that time (such as by generating a probability p for the portion of the audio stream and comparing p to a detection threshold DT or DST). The counter C may be incremented each instance the window slides and the detection model fails to detect a target sound activity. The counter C may be reset when the detection model detects a target sound activity.

For a first detection attempt, the high-power trigger 712 uses the first detection model to generate p and compares p to one or more of DT or DST. At decision block 1106, if p is greater than or equal to DT (indicating that the target sound activity is detected when the cascade audio spotting system is in the regular mode), the process continues to step 1108. At 1108, IS is increased by a defined amount "a," and C is reset to 0. While not shown, in some implementations, C may be incremented by 1 before decision block 1106 to indicate the first detection attempt by the high-power trigger 712.

Referring back to decision block 1106, if p is less than DT, p is also compared to DST. At decision block 1110, if p is greater than or equal to DST, the process continues to step 1112. At 1112, IS is increased by a defined amount "b," and C is reset to 0. Referring back to decision block 1110, if p is less than DST, the high-power trigger 712 does not detect the target sound activity using either DT or DST. As such, IS is not increased, and the process flows to decision block 1114.

The high-power trigger 712 compares the IS to an IS threshold (IST). The IST is a defined value to be used to determine whether the cascade audio spotting system is to switch from the regular mode to the sensitivity mode. The IST may be defined by the manufacturer, in software, by a user, or in any other suitable manner. At decision block 1114, if IS is greater than or equal to IST, the process continues to step 1120. At 1120, the cascade audio spotting system switches from operating in a regular mode to operating in a sensitivity mode. In some implementations of step 1120, the high-power trigger 712 switches from using the first set of hyperparameters for detection to the second set of hyperparameters for detection of a target sound activity. For example, the high-power trigger 712 may switch from using the DT to the DST for the first detection model. Additionally, the low-power trigger of the digital VAD may use different hyperparameters for detection or one or more detection modules may be disabled from use. If operations in switching from the regular mode to the sensitivity mode are to occur outside of the high-power subsystem 700, the high-power trigger 712 may be configured to generate a signal indicating the cascade audio spotting system is to switch operating modes, and the signal may be provided by the high-power subsystem to other components of the cascade audio spotting system in order to cause the cascade audio spotting system to switch operating modes.

Referring back to decision block 1114, if IS is less than IST, the process continues to step 1116. At 1116, C is incremented. The high-power trigger 712 compares C to a counter threshold (CT). CT may be a defined maximum amount of time between detections of the target sound activity that is allowed without resetting the IS and starting over in determining whether the cascade audio spotting system is to switch operating modes. At decision block 1118, if C is not greater than CT, the process reverts to decision block 1106, and the high-power trigger 712 attempts to detect the target sound activity during a next instance of the received audio stream (such as conceptually described above as temporally sliding the window along the audio stream to a next position and attempting to detect the target sound activity in the audio stream within the new position of the window). Referring back to decision block 1118, if C is greater than CT, the process reverts to step 1104 (with IS and C being reset to 0). To note, values a and b may be considered hyperparameters, with a included in the first set of hyperparameters and b included in the second set of hyperparameters. a and b may be the same or different. For example, a may be greater than b to have a more significant impact on the IS. In this manner, the IS is increased more if both DST and DT could be used to detect the target sound activity than if only the DST could be used to detect the target sound activity. To note, a, b, IS, IST, and CT may be any suitable values defined in any suitable manner. For example, a, b, IS, IST, and CT may be defined by an expert or tester based on testing the cascade audio spotting system using various training data to determine optimal. The defined values may be set in the memory of the audio processing device and used when the audio processing device in deployed in a user's home or other environment.

As noted above, operation 1100 in FIG. 11 is based on one detection model being used by the high-power trigger 712. In some implementations, the high-power trigger 712 may be configured to perform ensembling. For example, if using ensembling, the high-power trigger 712 may use one or more additional detection models to the first detection model. Each of the one or more additional detection models is used to generate an additional probability that the one or more audio streams includes the target sound activity. For each additional probability, the high-power trigger 712 compares the additional probability to a detection threshold associated with the additional detection model to detect by the associated detection model whether the target sound activity is included in the one or more audio streams. The high-power trigger 712 also counts a number of detection models that detect that the target sound activity is included in the one or more audio streams and compares the number to a first ensemble threshold. As described above, the ensemble threshold for the regular mode may be ET, and the ensemble threshold for the sensitivity mode may be EST. In some implementations, counting the number of detection models that detect the target sound activity may include generating a number r, which is the number of detection models that detect the target sound activity to the total number of detection models being used by the high-power trigger. r may be a value in a range from 0 to 1, and the ET and EST may be defined as a value in a range from 0 to 1.

As depicted in FIG. 11, determining whether to switch operating modes may be based on both a DT and a DST. In addition or to the alternative, determining whether to switch between a regular mode and a sensitivity mode may be based on an ET and an EST. Similar to DST typically being less than DT, EST may be less than ET to reduce the FRR for the sensitivity mode.

Figure 12:
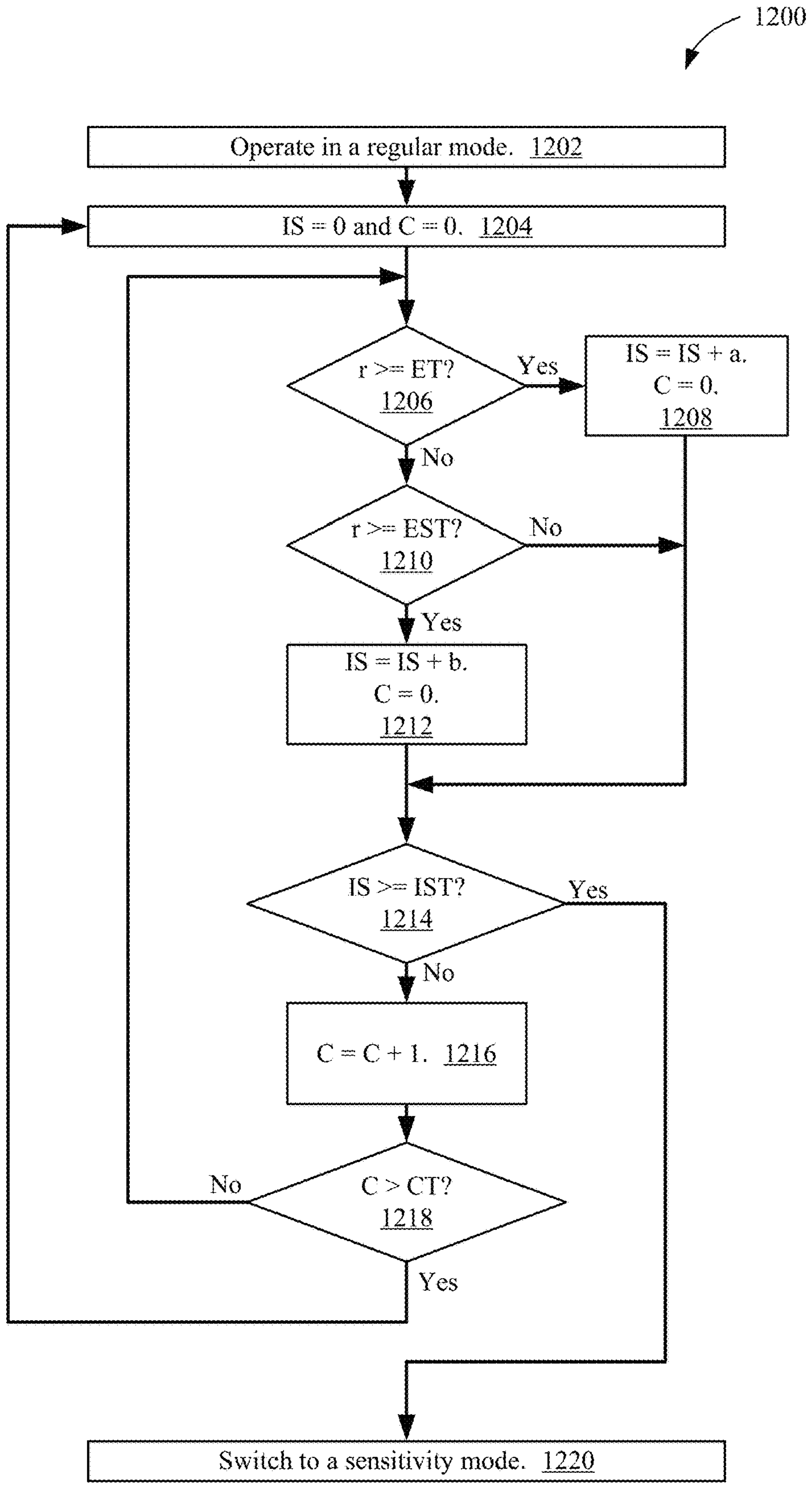
FIG. 12 illustrates a flow chart depicting another example implementation of the operation depicted in FIG. 10.

FIG. 12 illustrates a flow chart depicting another example implementation of the operation depicted in FIG. 10. The operation 1200 is based on the high-power trigger 712 using a plurality of detection models to generate a decision as to whether the detection model detects a target sound activity. The final determination by the high-power trigger 712 as to whether the target sound activity is detected is based on an ensemble threshold. As noted above, the first set of hyperparameters may include an ET, and a second set of hyperparameters may include an EST. Many of the steps of operation 1200 in FIG. 12 may be the same as the steps of operation 1100 in FIG. 11. At 1202, the cascade audio spotting system operates in a regular mode (similar to step 1102). At 1204, IS and C may be initialized (which is the same as step 1104). In attempting to detect a target sound activity using ensembling, the high-power trigger 712 generates r based on the number of detection models that detect the target sound activity. In decision block 1206, if r is greater than or equal to ET, the high-power trigger 712 detects the target sound activity (with the process continuing to step 1208). At 1208, IS is increased by a, and C is reset to 0. As noted above, a (and b) may be any suitable value for increasing IS.

Referring back to decision block 1206, if r is less than ET, the high-power trigger 712 may compare r to EST. At decision block 1210, if r is greater than or equal to EST, the process continues to step 1212. At 1212, IS is increased by b, and C is reset to 0. As noted above, a may be greater than b to have a more significant impact on the IS. In this manner, the IS is increased more if both EST and ET could be used to detect the target sound activity than if only the EST could be used to detect the target sound activity. Referring back to decision block 1210, if r is less than EST, the high-power trigger 712 does not detect the target sound activity using either ET or EST. As such, IS is not increased, and the process flows to decision block 1214.

Operation of decision block 1214, step 1216, and decision block 1218 is the same as operation of decision block 1114, step 1116, and decision block 1118, respectively, in determining whether to switch from a regular mode to a sensitivity mode. At 1220, the cascade audio spotting system switches to a sensitivity mode. For example, similar to 1120, the high-power trigger 712 (or other components of the cascade audio spotting system) may switch from using the first set of hyperparameters to the second set of hyperparameters in detecting the target sound activity. In a specific example, the high-power trigger 712 may switch from using ET to using EST when switching from the regular mode to the sensitivity mode.

While r is depicted as one value being compared to ET and EST in FIG. 12, in some implementations, a sensitivity mode may also include different detection thresholds (or other hyperparameters) for one or more detection models. While not shown, in some implementations, the high-power trigger 712 may generate multiple instances of r, such as r1 using the DTs for the one or more detection models and r2 using the DSTs for the one or more detection models. In this manner, the high-power trigger 712 may compare r1 to ET and r2 to EST for decision blocks 1206 and 1210, respectively. Referring back to step 1220, switching from the regular mode to the sensitivity mode may include the high-power trigger 712 performing one or more of: switching between using a DT and a DST for a first detection model; switching between using a DT and a DST associated with an additional detection model of one or more additional detection models to the first detection model; or switching between using an ET and an EST for ensembling.

Figure 13:
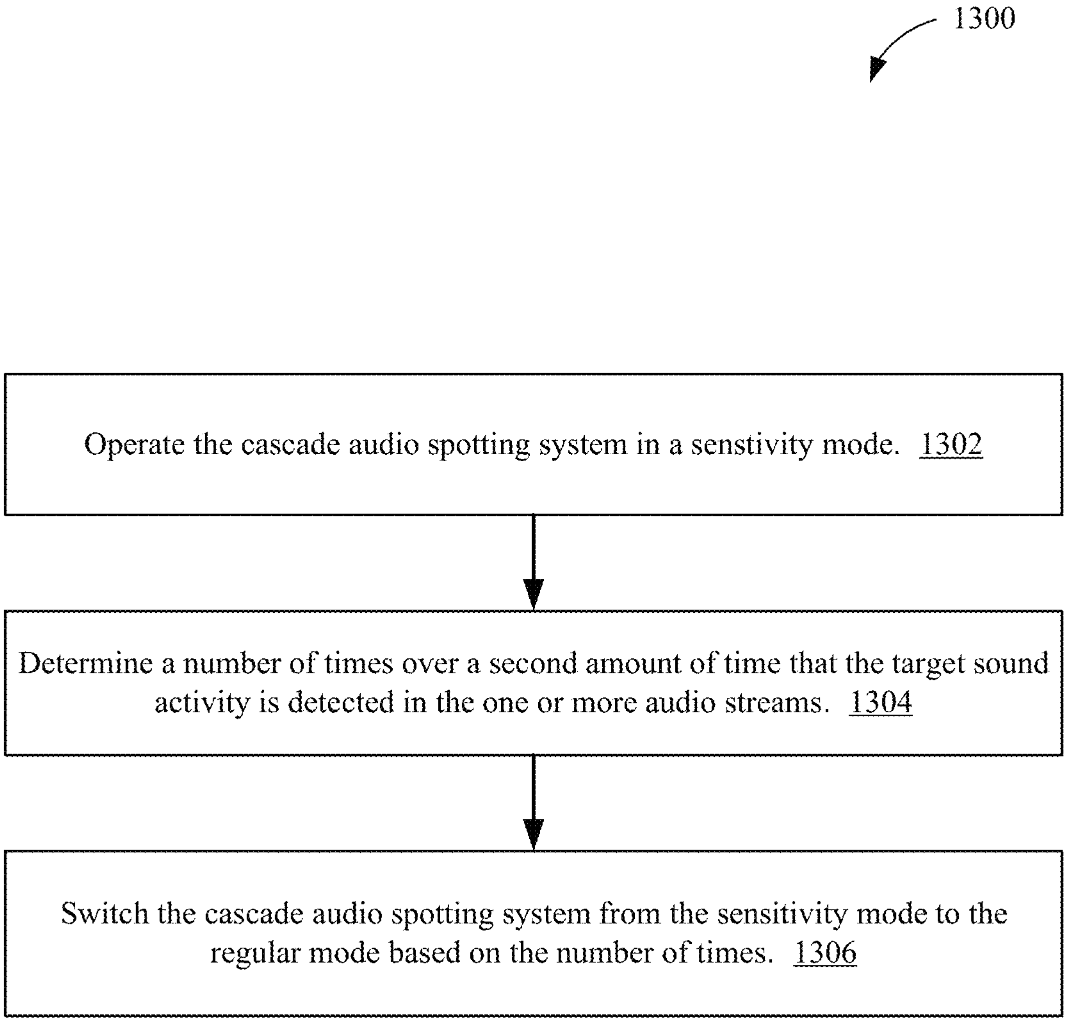
FIG. 13 illustrates a flow chart depicting an example operation of a cascade audio spotting system switching from a sensitivity mode to a regular mode.
Figure 14:
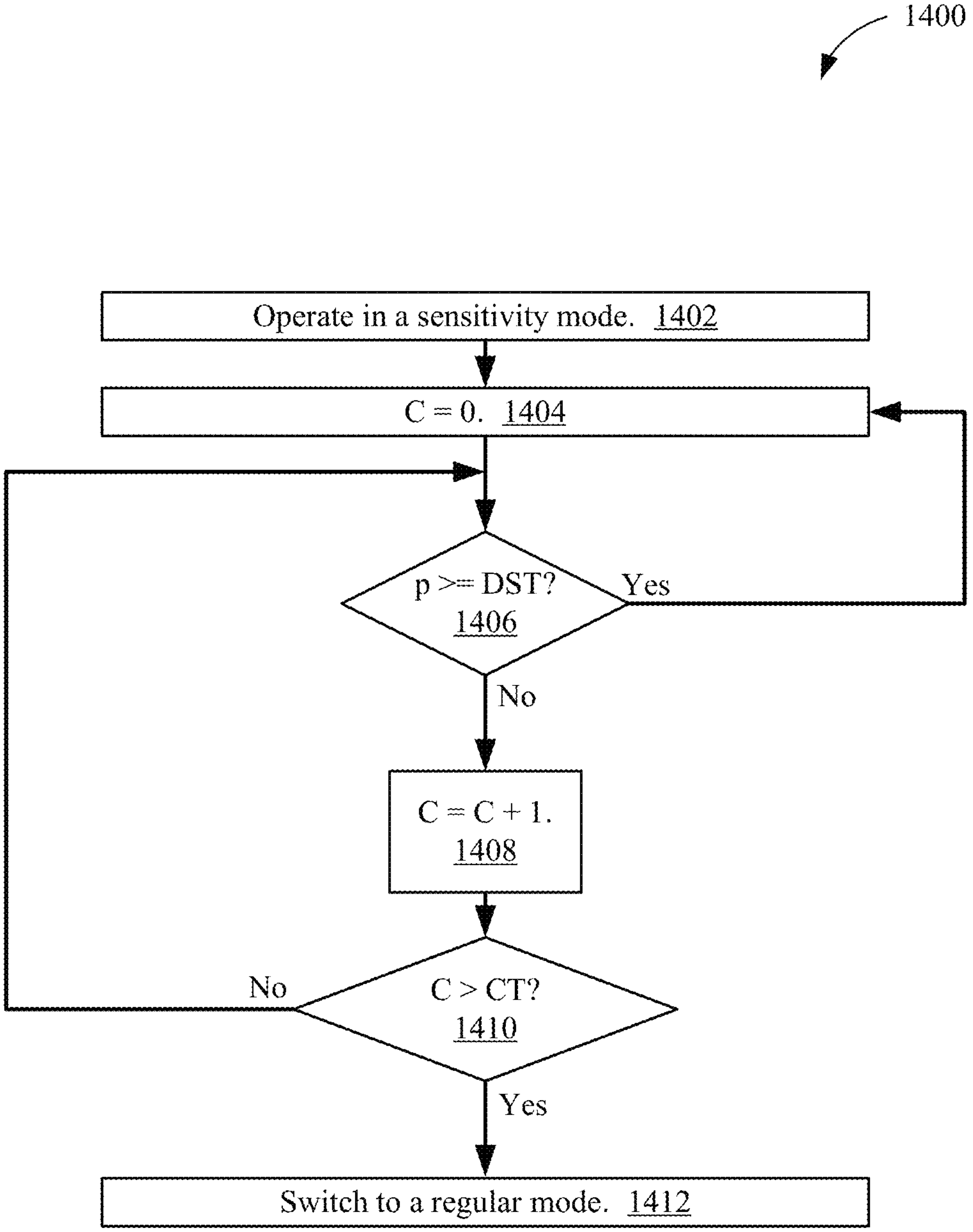
FIG. 14 illustrates a flow chart depicting an example implementation of the operation depicted in FIG. 13.
Figure 15:
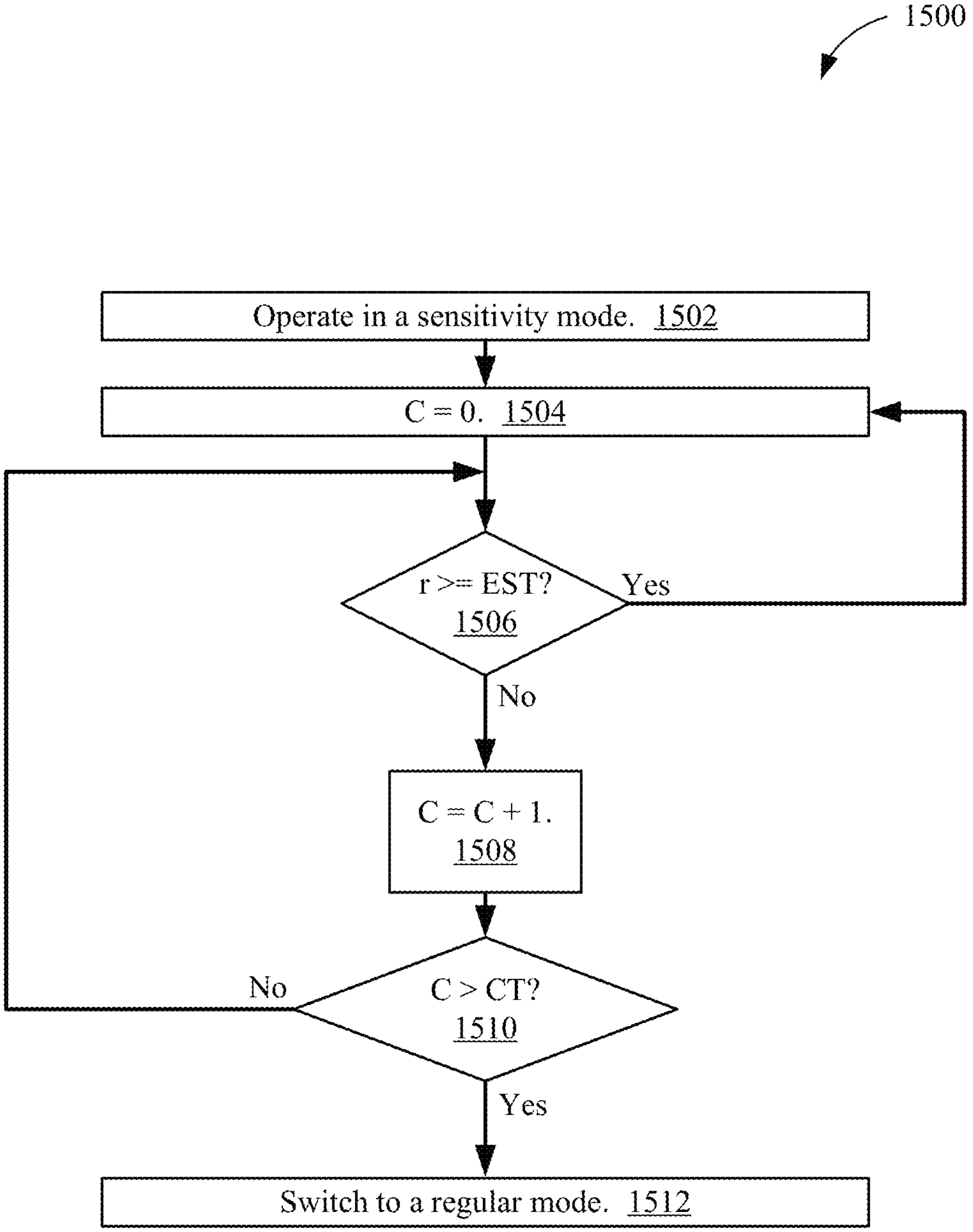
FIG. 15 illustrates a flow chart depicting another example implementation of the operation depicted in FIG. 13.

FIGS. 10-12 depict example operations for switching from a regular mode to a sensitivity mode. FIGS. 13-15 depict example operations for switching back from the sensitivity mode to the regular mode. In the example implementations depicted in FIGS. 10-12, switching from the regular mode to the sensitivity mode is based on a frequency a user is interacting with an audio processing device. Switching back to the regular mode from the sensitivity mode may be based on the frequency of interaction being reduced or stopping. For example, the cascade audio spotting system may automatically revert back to the regular mode if an amount of time between successive detections of a target sound activity is greater than a threshold amount of time (such as ten seconds between a spoken keyword being identified to wake up the audio processing device). In another example, reverting back to the regular mode may be based on the number of times the target sound activity is detected during an amount of time is greater than a threshold number (such as 2, 3, or more times during a 30 second period).

FIG. 13 illustrates a flow chart depicting an example operation 1300 of a cascade audio spotting system switching from a sensitivity mode to a regular mode. At 1302, the cascade audio spotting system is operating in a sensitivity mode. For example, the high-power trigger 712 may use a second set of hyperparameters for detection. In addition or to the alternative, a low-power trigger or a digital VAD may use a different set of hyperparameters and one or more detection modules may be disabled or bypassed, such as described above.

At 1304, the high-power trigger determines a number of times over a second amount of time that the target sound activity is detected in the one or more audio streams. For example, the second set of hyperparameters associated with the sensitivity mode is used by the high-power trigger 712 to detect a target sound activity in one or more processed audio streams received by the high-power trigger. In some implementations, the number of times over a second amount of time may refer to a number of detections during a defined amount of time. In some other implementations, the number of times over a second amount of time may refer to successive detections being spaced apart by less than a threshold amount of time. Implementation of the second amount of time may be similar to the first amount of time described above with reference to switching from the regular mode to the sensitivity mode.

At 1306, the cascade audio spotting system switches from the sensitivity mode to the regular mode based on the number of times. In some implementations, if the number of times is less than a threshold number over a defined amount of time, the cascade audio spotting system switches operating modes. In some other implementations, if the amount of time between successive detections of the target sound activity is greater than a threshold amount of time, the cascade audio spotting system switched operating modes.

FIG. 14 illustrates a flow chart depicting an example implementation of the operation 1300 depicted in FIG. 13. Operation 1400 is based on the use of one detection model by the high-power trigger 712 in determining when to switch operating modes. Operation 1400 may be complementary to operation 1100 in FIG. 11.

At 1402, the cascade audio spotting system operates in a sensitivity mode. For example, the high-power trigger 712 uses a second set of hyperparameters to detect a target sound activity. The second set of hyperparameters may include a DST associated with a first detection model of the high-power trigger 712.

At 1404, the counter c is initialized (such as being set to 0). For a first instance of processing an audio stream, the high-power trigger 712 uses the first detection model (which may be configured using the second set of hyperparameters) to generate p, and the high-power trigger 712 compares p to DST. At decision block 1406, if p is greater than or equal to DST, the target sound activity is detected. As such, the process reverts to step 1404, and C is reset to 0. If p is less than DST, the high-power trigger 712 does not detect the target sound activity. As such, the process continues to step 1408. At 1408, C is incremented. C is compared to a counter threshold (CT) indicating a maximum amount of time that is to occur between successive detection of the target sound activity. At decision block 1410, if C is not greater than CT (indicating that the maximum amount of time has not yet passed), the process reverts to decision block 1406, with the high-power trigger 712 performing a next instance of attempting to detect the target sound activity. Referring back to decision block 1410, if C is greater than CT, more than the maximum amount of time between successive detections has passed. As such, the process continues to step 1412. At 1412, the cascade audio spotting system switches from the sensitivity mode to the regular mode. For example, the high-power trigger 712 goes back to using the first set of hyperparameters. In some implementations, the low-power trigger or the digital VAD may go back to using a first set of hyperparameters. Additionally or alternatively, any detection modules disabled or bypassed in the sensitivity mode may be reenabled for use.

If the high-power trigger 712 uses ensembling, detection of the target sound activity is based on a decision resulting from the use of ensembling. For example, an EST may be used by the high-power trigger 712 to determine whether a target sound activity is detected.

FIG. 15 illustrates a flow chart depicting another example implementation of the operation 1300 depicted in FIG. 13. In contrast to operation 1400 in FIG. 14, operation 1500 includes use of an EST for detecting a target sound activity. Operation 1500 may be complementary to operation 1200 in FIG. 12.

At 1502, the cascade audio spotting system operates in a sensitivity mode. At 1504, C is initialized (such as set to 0). Steps 1502 and 1504 may be the same as steps 1402 and 1404, respectively, except that the high-power trigger 712 is configured to use ensembling for operation 1500. For a first instance, the high-power trigger 712 generates r and compares r to EST. At decision block 1506, if r is greater than or equal to EST, the target sound activity is detected. As such, the process reverts to step 1504, with C being kept at or reset to 0. If r is less than EST, the target sound activity is not detected. As such, the process continues to step 1508. Operations of step 1508 and decision block 1510 are the same as step 1408 and decision block 1410, respectively.

If C is greater than CT (indicating that the maximum amount of time between detections has passed), the cascade audio spotting system switches to a regular mode from the sensitivity mode (1512). As noted above, switching to the regular mode may include the high-power trigger 712 switching from using the second set of hyperparameters to the first set of hyperparameters. In some implementations, switching sets of hyperparameters includes switching from using the EST included in the second set of hyperparameters to using an ET included in the first set of hyperparameters.

As described herein, implementations of a cascade audio spotting system are presented to reduce power and processing resource consumption while maintaining a high level of performance. In addition, implementations of the cascade audio spotting system operating in various modes depending on a desired level of sensitivity in detecting a target sound activity are presented to increase the performance of the cascade audio spotting system and the audio processing device including the cascade audio spotting system.

In the above description, numerous specific details have been set forth as examples of specific components, circuits, and processes to provide a thorough understanding of the present disclosure. The term "coupled" as used herein means connected directly to or connected through one or more intervening components or circuits. Also, in the description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise, it is appreciated that, throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "identifying," "detecting," "generating," "providing," "outputting," "obtaining," "receiving," or the like refer to the actions and processes of a computer system, or similar electronic computing device, that manipulates and transforms data represented as physical (electronic) quantities within the computer system's registers, memories, or other components into other data similarly represented as physical quantities within the computer system memories or registers or other such information storage, transceiver, display devices, or other components.

The techniques described herein may be implemented in hardware, software, firmware, or any combination thereof, unless specifically described as being implemented in a specific manner. For example, the methods, sequences or algorithms described in connection with the aspects disclosed herein may be embodied directly in one or more hardware modules, in one or more software modules executed by a processor, or in a combination of the two. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described. The non-transitory computer-readable storage medium may form part of a computer program product, which may include packaging materials. The non-transitory computer-readable storage medium may comprise one or a plurality of random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. Various illustrative logical blocks, modules, and instructions embodied in software and described in connection with the embodiments disclosed herein may be executed by one or more processors. The term "processor," as used herein, may refer to one or a plurality of any general purpose processor, conventional processor, controller, microcontroller, and/or state machine capable of executing scripts or instructions of one or more software programs stored in memory. If implemented in hardware, the techniques may be realized at least in part by one or more dedicated or general purpose circuits, which may include any suitable integrated circuit. A circuit may include any combination of electronic components to process signals in analog or digital form.

In the specification, embodiments have been described with reference to specific examples. It will, however, be evident that various modifications and changes may be made without departing from the broader scope of the disclosure as set forth in the appended claims. For example, while a cascade KWS is described in many of the examples for spotting spoken keywords, any suitable cascade audio spotting system may be used for spotting other types of audio events, such as a specific pattern of sound in the environment to be used to control an audio-controlled device. Additionally, while the examples are described as a device including the cascade audio spotting system, the microphones, and the remainder of the audio control logic for processing commands, one or more of the components may be separate from the device or may exist in a distributed manner. For example, a cascade audio spotting system may receive audio streams from a remote system capturing the audio streams. In another example, a separate system than the audio processing device may be used to detect and process one or more voice commands after a spoken keyword is detected. As such, the specification and drawings are, accordingly, to be regarded in an illustrative sense rather than a restrictive sense.

What is claimed is:

1. A method of operating a cascade audio spotting system, comprising:

receiving, by an analog voice activity detector (VAD) of the cascade audio spotting system, an analog audio stream from one or more audio streams;

detecting, by the analog VAD, whether the analog audio stream includes a dynamic audio signal;

providing, by the analog VAD, a first indication in response to detecting that the analog audio stream includes the dynamic audio signal;

activating a digital VAD of the cascade audio spotting system in response to the first indication being provided;

receiving, by the digital VAD, a digital audio stream from the one or more audio streams, wherein the digital audio stream is converted by an analog to digital converter (ADC) of the cascade audio spotting system before being received by the digital VAD;

detecting, by the digital VAD, whether the digital audio stream includes a speech signal;

providing, by the digital VAD, a second indication in response to detecting that the digital audio stream includes the speech signal;

activating a low-power trigger of the cascade audio spotting system in response to the second indication being provided;

receiving, by a first module of the cascade audio spotting system, an audio stream from the one or more audio streams, wherein:

the first module includes the low-power trigger; and the audio stream received by the first module is the digital audio stream;

processing, by the first module, the audio stream to detect a first target sound activity in the audio stream, wherein the first target sound activity includes one or more spoken keywords;

providing a first signal by the first module in response to detecting the first target sound activity in the audio stream;

in response to the first signal being provided by the first module:

activating a high-power subsystem;

receiving the one or more audio streams by the high-power subsystem; and processing the one or more audio streams by the high-power subsystem to detect a second target sound activity in the one or more audio streams.

2. The method of claim 1, wherein activating the high-power subsystem includes switching the high-power subsystem from a low power mode to an active mode in response to the first signal being provided by the first module.

3. The method of claim 1, wherein the first module includes one of:

the analog VAD, wherein the audio stream includes the analog audio stream; or the digital VAD, wherein the audio stream includes a stream of digital audio frames converted from the analog audio stream.

4. The method of claim 3, wherein the low-power trigger includes a first set of one or more detection models to identify the first target sound activity in the audio stream, wherein:

the first set of one or more detection models is associated with a first set of one or more hyperparameters for the low-power trigger.

5. The method of claim 4, wherein the high-power subsystem includes a high-power trigger to detect a second target sound activity in the one or more audio streams, wherein:

the high-power trigger includes a second set of one or more detection models to identify the second target sound activity;

the second set of one or more detection models is associated with a second set of one or more hyperparameters for the high-power trigger; and the second target sound activity is the same as the first target sound activity.

6. The method of claim 5, wherein:

the second set of one or more detection models for the high-power trigger includes the first set of one or more detection models; and the set of one or more hyperparameters associated with the first set of one or more detection models for the high-power trigger differs from the first set of one or more hyperparameters.

7. The method of claim 5, wherein the first set of one or more detection models and the second set of one or more detection models are stored in a shared memory for the low-power trigger and the high-power trigger.

8. The method of claim 1, further comprising:

receiving, by the high-power subsystem, a reference signal associated with the one or more audio streams, wherein processing the one or more audio streams by the high-power subsystem includes:

detecting whether the second target sound activity is included in the reference signal; and preventing detecting the second target sound activity in the one or more audio streams in response to detecting the second target sound activity in the reference signal.

9. The method of claim 1, wherein processing the one or more audio streams by the high-power subsystem includes:

performing echo cancellation on the one or more audio streams based on a reference signal to generate one or more echo canceled audio streams; and detecting whether the second target sound activity is included in the one or more echo canceled audio streams.

10. The method of claim 9, wherein processing the one or more audio streams by the high-power subsystem includes:

performing multiple channel noise reduction (MCNR) on the one or more echo canceled audio streams to generate one or more MCNR outputs; and detecting whether the second target sound activity is included in the one or more MCNR outputs.

11. The method of claim 10, wherein performing MCNR on the one or more echo canceled audio streams includes:

estimating a first direction of a first portion of sound activity with reference to the cascade audio spotting system;

generating a first MCNR output for the first portion of sound activity based on the first direction;

estimating a second direction of a second portion of sound activity with reference to the cascade audio spotting system; and generating a second MCNR output for the second portion of sound activity based on the second direction.

12. The method of claim 11, further comprising:

detecting whether the second target sound activity is included in one of the first MCNR output or the second MCNR output, wherein detecting the second target sound activity in the one or more audio streams includes detecting the second target sound activity in at least one of the first MCNR output or the second MCNR output; and in response to detecting that the second target sound activity is included in one of the first MCNR output or the second MCNR output, providing the MCNR output including the second target sound activity to identify one or more commands for operations to be performed.

13. The method of claim 1, wherein processing the one or more audio streams by the high-power subsystem includes using a plurality of detection models of a high-power trigger of the high-power subsystem to detect the second target sound activity in the one or more audio streams, including:

for each detection model of the plurality of detection models, detecting whether the second target sound activity is included in the one or more audio streams;

counting a number of detection models that detect the second target sound activity in the one or more audio streams;

comparing the number of detection models that detect the second target sound activity in the one or more audio streams to an ensemble threshold; and detecting whether the second target sound activity is included in the one or more audio streams based on the comparison.

14. The method of claim 1, further comprising:

activating the ADC in response to the first indication being provided; and generating, by the ADC, the digital audio stream.

15. A cascade audio spotting system, comprising:

an analog voice activity detector (VAD) to:

receive an analog audio stream from one or more audio streams;

detect whether the analog audio stream includes a dynamic audio signal; and provide a first indication in response to detecting that the analog audio stream includes the dynamic audio signal;

a digital VAD to:

activate in response to the first indication being provided;

receive a digital audio stream from the one or more audio streams, wherein the digital audio stream is converted by an analog to digital converter (ADC) of the cascade audio spotting system before being received by the digital VAD;

detect whether the digital audio stream includes a speech signal; and provide a second indication in response to detecting that the digital audio stream includes the speech signal;

a low-power trigger to activate in response to the second indication being provided;

a first module to:

receive an audio stream from the one or more audio streams;

process the audio stream to detect a first target sound activity in the audio stream; and provide a first signal in response to detecting the first target sound activity in the audio stream, wherein:

the first module includes the low-power trigger;

the audio stream received by the first module is the digital audio stream; and the first target sound activity includes one or more spoken keywords; and a high-power subsystem to, in response to the first signal being provided by the first module:

activate;

receive the one or more audio streams; and process the one or more audio streams to detect a second target sound activity in the one or more audio streams.

16. The cascade audio spotting system of claim 15, wherein the high-power subsystem activating includes the high-power subsystem switching from a low power mode to an active mode in response to the first signal being provided by the first module.

17. The cascade audio spotting system of claim 15, wherein the first module includes one of:

the analog VAD, wherein the audio stream includes e analog audio stream; or the digital VAD, wherein the audio stream includes a stream of digital audio frames converted from the analog audio stream.

18. The cascade audio spotting system of claim 17, wherein:

the low-power trigger includes a first set of one or more detection models to identify the first target sound activity in the audio stream, wherein:

the first set of one or more detection models is associated with a first set of one or more hyperparameters for the low-power trigger;

the high-power subsystem includes a high-power trigger to detect a second target sound activity in the one or more audio streams, wherein:

the high-power trigger includes a second set of one or more detection models to identify the second target sound activity, wherein the second target sound activity is the same as the first target sound activity;

the second set of one or more detection models is associated with a second set of one or more hyperparameters for the high-power trigger;

the second set of one or more detection models for the high-power trigger includes the first set of one or more detection models; and the set of one or more hyperparameters associated with the first set of one or more detection models for the high-power trigger differs from the first set of one or more hyperparameters.

19. The cascade audio spotting system of claim 15, wherein the ADC is to:

activate in response to the first indication being provided; and generate the digital audio stream.

* * * * *